(12) United States Patent
Oh et al.

(10) Patent No.: US 11,547,062 B2
(45) Date of Patent: Jan. 10, 2023

(54) PLANT CULTIVATION METHOD USING UV AND PLANT CULTIVATION SYSTEM THEREFOR

(71) Applicants: INDUSTRY-UNIVERSITY COOPERATION FOUNDATION OF CHUNGBUK NATIONAL UNIVERSITY, Chungcheongbuk-do (KR); SEOUL VIOSYS CO., LTD., Gyeonggi-do (KR)

(72) Inventors: Myung Min Oh, Chungcheongbuk-do (KR); Jin Hui Lee, Chungcheongbuk-do (KR); Jong Hyun Koo, Ansan-si (KR)

(73) Assignee: Seoul Viosys Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/073,763

(22) Filed: Oct. 19, 2020

(65) Prior Publication Data

US 2021/0092906 A1    Apr. 1, 2021

Related U.S. Application Data

(63) Continuation of application No. PCT/KR2019/004711, filed on Apr. 18, 2019.

(30) Foreign Application Priority Data

Apr. 20, 2018 (KR) ........................ 10-2018-0046266

(51) Int. Cl.
*A01G 7/04* (2006.01)
(52) U.S. Cl.
CPC .................................. *A01G 7/045* (2013.01)
(58) Field of Classification Search
CPC ... A01G 7/06; A01G 7/00; A01G 7/04; A01G 7/045; G01N 21/84
See application file for complete search history.

(56) References Cited

U.S. PATENT DOCUMENTS

2020/0178474 A1    6/2020 Oh et al.

FOREIGN PATENT DOCUMENTS

| CN | 102182965 A | 9/2011 |
|---|---|---|
| CN | 103476243 A | 12/2013 |
| CN | 106413378 A | 2/2017 |
| CN | 107356569 A | 11/2017 |
| CN | 107535212 A | 1/2018 |
| KR | 10-1027205 | 4/2011 |
| KR | 10-2013-0114880 | 10/2013 |
| KR | 1020140045111 A | 4/2014 |
| KR | 10-2017-0141974 | 12/2017 |
| KR | 10-2018-0006325 | 1/2018 |
| KR | 10-2018-0009115 | 1/2018 |
| KR | 20180009115 A * | 1/2018 |

OTHER PUBLICATIONS

Chen et al. UVA Radiation Is Beneficial for Yield and Quality of Indoor Cultivated Lettuce. Frontiers in Plant Science, vol. 10, Article 1563, 2019, pp. 1-10. (Year: 2019).*
Kang et al. Ultraviolet-A Radiation Stimulates Growth of Indoor Cultivated Tomato (*Solanum lycopersicum*) Seedlings. HortScience 53(10): 1429-1433, 2018. (Year: 2018).*
Lee et al. Short-term UV-A LED Irradiation Improves Growth and Phytochemicals of Kale Plants. Korean Journal of Horticultural Science & Technology vol. 34, No. 1, 2016, p. 96, document No. 102. (Year: 2016).*
Kim. Thesis, Determination of Optimal UV Stress Period before Harvest for Maximizing Phytochemical Production of Kale Cultivated in Plant Factories, Seoul National University, 2017, 1-31. (Year: 2017).*
Kim et al. KR20180009115A Espacenet English translation, 7 pp. (Year: 2021).*
Lee et al. Growth and Phenolic Content of Sowthistle Grown in a Closed-type Plant Production System with a UV-A or UV-B Lamp Hort. Environ. Biotenhnol. 54(6):492-500, 2013. (Year: 2013).*
Lichtenthaler et al. Detection of photosynthetic activity and water stress by imaging the red chlorophyll fluorescence. Plant Physiol. Biochem. 38 (2000) 889-895. (Year: 2000).*
Maxwell et al. Chlorophyll fluorescence—a practical guide. Journal of Experimental Botany, vol. 51, No. 345, pp. 659-668, 2000. (Year: 2000).*
Ritchie. Chlorophyll Fluorescence: What is it and What Do the Numbers Mean? USDA Forest Service Proceeding RMRS P-43, pp. 34-43, 2006. (Year: 2006).*
International Search Report for International Application PCT/KR2019/004711, dated Aug. 2, 2019.
Supplementary European Search Report issued in corresponding EP Application 19788361.4, dated Jan. 5, 2022, 8 pages.
Office Action issued in corresponding CN Application 201980002969.3, dated Jan. 12, 2022, 8 pages.

* cited by examiner

*Primary Examiner* — June Hwu
(74) *Attorney, Agent, or Firm* — LaBatt, LLC

(57) ABSTRACT

A plant cultivation method includes the steps of: applying supplementary light treatment to a selected plant with UVA, measuring a maximum quantum yield of the selected plant; and determining a cultivation step of the plant according to the measured maximum quantum yield.

18 Claims, 35 Drawing Sheets

Irradiation of UVA having peak control sample

Irradiation of UVA having peak

Kale Sample Subjected to UVA irradiation

PLANT CULTIVATION METHOD USING UV AND PLANT CULTIVATION SYSTEM THEREFOR

CROSS REFERENCE TO RELATED APPLICATION

This application is a Continuation of International Patent Application No. PCT/KR2019/004711, filed on Apr. 18, 2019, and claims priority from and the benefit of Korean Patent Application No. 10-2018-0046266, filed on Apr. 20, 2018, each of which is incorporated by reference for all purposes as if fully set forth herein.

BACKGROUND

Field

Embodiments of the present disclosure relate to a plant cultivation method using UV and a plant cultivation system for the same.

Discussion of the Background

Plants produce organic matter from carbon dioxide and water using light energy through photosynthesis. Plants use chemical energy of organic matter obtained through photosynthesis as nutrients for growth.

Plants contain phytochemicals that have beneficial effects on a subject in need thereof. Phytochemical levels of plants vary depending on growth environments. For example, plants produce antioxidants to protect themselves against damage from oxidative stress. When a human eats a plant that contains a large amount of phytochemicals, such phytochemicals cause similar effects on the human body. Thus, in order to obtain phytochemicals efficiently, a plant needs to be harvested when the plant contains as many phytochemicals as possible.

Therefore, it is necessary to determine the growth state and phytochemical content of a plant. In addition, there is a need for a method of improving the growth and phytochemical content of a plant.

The above information disclosed in this Background section is only for understanding of the background of the inventive concept, and, therefore, it may contain information that does not constitute prior art.

SUMMARY

Embodiments of the present disclosure provide a plant cultivation method which can non-destructively determine appropriate harvest time, and a plant cultivation system for the same.

Embodiments of the present disclosure provide a plant cultivation method, which allows a plant to be harvested when the phytochemical content of the plant reaches a sufficient level, and a plant cultivation system for the same.

In accordance with one embodiment of the present disclosure, a plant cultivation method using UVA includes: applying supplemental UVA lighting treatment to the plant; measuring a maximum quantum yield of the plant; and determining a cultivation stage of the plant based on the measured maximum quantum yield.

In accordance with another embodiment of the present disclosure, a plant cultivation system includes: a plant cultivation chamber providing a space for cultivation of a plant; a light source illuminating the plant with light comprising at least one of visible light and white light; a supplemental lighting unit illuminating the plant with UVA; and a quantum yield measurement unit measuring a maximum quantum yield of the plant.

The method and system for plant cultivation according to embodiments of the present disclosure can improve the growth and phytochemical content of a plant by applying supplemental UVA lighting treatment to the plant.

In addition, the method and system for plant cultivation according to embodiments of the present disclosure can determine a point in time at which a plant reaches sufficient growth and has sufficiently high phytochemical content based on measurement of the maximum quantum yield of the plant.

Further, the method and system for plant cultivation according to embodiments of the present disclosure can non-destructively determine an appropriate period of supplemental UVA lighting treatment to increase phytochemicals in a plant and an appropriate harvest time when the plant contains a large amount of phytochemicals, based on measurement of the maximum quantum yield of the plant.

BRIEF DESCRIPTION OF THE DRAWINGS

FIG. 3 shows a result of determining changes in total phenolic content;

FIG. 4 shows a result of determining changes in antioxidant capacity;

FIG. 5 shows a result of determining changes in total phenolic content per day;

FIG. 6 shows a result of determining changes in antioxidant capacity per day;

FIG. 7 shows a result of determining changes in total phenolic content per three days; and FIG. 8 shows a result of determining changes in antioxidant capacity per three days.

FIG. 12 shows a graph of determining changes in total phenolic content;

FIG. 13 shows a graph of determining changes in antioxidant capacity;

FIG. 14 shows a graph of determining changes in total phenolic content per day;

FIG. 15 shows a graph of determining changes in antioxidant capacity per day;

FIG. 16 shows a graph of determining changes in total phenolic content per three days; and FIG. 17 shows a graph of determining changes in antioxidant capacity per three days.

FIG. 19 is a graph showing shoot fresh weight of the ice plant;

FIG. 20 is a graph showing shoot dry weight of the ice plant;

FIG. 21 is a graph showing leaf area of the ice plant; and

FIG. 22 is a graph showing SPAD value of the ice plant.

FIG. 25 is a graph showing total phenolic content in the ice plant; and

FIG. 26 is a graph showing antioxidant capacity in the ice plant.

FIG. 27 is a graph showing fresh weight above-ground part of kale;

FIG. 28 is a graph showing fresh weight underground part of kale;

FIG. 29 is a graph showing dry weight above-ground part of kale; and

FIG. 30 is a graph showing dry weight of underground part of kale.

FIG. 33 is a graph showing total chlorophyll content of kale with low light intensity control; and FIG. 34 is a graph showing total chlorophyll content of kale with high light intensity control.

FIG. 35 is a graph showing total phenolic content in kale with low light intensity control;

FIG. 36 is a graph showing antioxidant capacity in kale with low light intensity control;

FIG. 37 is a graph showing total phenolic content in kale with high light intensity control; and FIG. 38 is a graph showing antioxidant capacity in kale with high light intensity control.

FIG. 39 is a graph showing the PAL activity of kale with low light intensity control; and FIG. 40 is a graph showing the PAL activity of kale with high light intensity control.

DETAILED DESCRIPTION

Figure 1A:
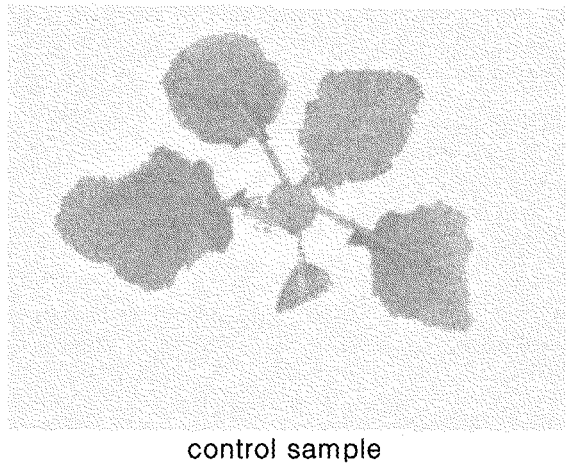
FIG. 1 shows results of determining relations between UV irradiation and maximum quantum yield according to one embodiment of the present disclosure.

The above and other aspects, features, and advantages of embodiments of the present disclosure will become apparent from the detailed description of the following embodiments in conjunction with the accompanying drawings. It should be understood that the following embodiments are provided for complete disclosure and thorough understanding of the present disclosure by those skilled in the art. Therefore, the present disclosure is not limited to the following embodiments and may be embodied in different ways.

Herein, the term, "plant" refers to a leafy vegetable or a medicinal plant. For example, the plant may include kale, Chinese cabbage, lettuce, mallow, crown daisy, cabbage, celery, spinach, beetroot, bok choy, chicory, asparagus, vegetables for wraps, and herbs, without being limited thereto.

Embodiments of the present disclosure have been conceived to meet the aforementioned needs and provide a method of determining stress in a plant based on the chlorophyll fluorescence value (maximum quantum yield) of the plant to increase the content of phytochemicals in the plant.

In accordance with embodiments of the present disclosure, a method of determining stress in a plant to increase the content of phytochemicals of the plant is provided. The method includes (i) acquiring a chlorophyll fluorescence image of the entire plant; (ii) obtaining the value of chlorophyll fluorescence emitted from photosystem II (PS II) of the plant using the acquired fluorescence image; and (iii) determining stress characteristics of the plant by estimating the content of the phytochemicals in the plant from the obtained chlorophyll fluorescence value.

In the method of determining stress in the plant according to the teachings of the present disclosure, the step of acquiring the chlorophyll fluorescence image (step (i)) is carried out using a chlorophyll fluorescence image acquisition apparatus including a chamber blocking external light, a blue light source inducing fluorescence of the plant, a filter filtering only chlorophyll fluorescence of the plant from reflected light, a camera photographing the filtered chlorophyll fluorescence, and an image processor processing acquired image information. Here, the blue light source inducing fluorescence of the plant may be an LED. However, it will be understood that the present disclosure is not limited thereto and a white LED may be used as a light source inducing fluorescence of the plant.

In the method of determining stress in the plant, the step of determining the stress characteristics of the plant (step (iii)) includes analyzing correlations between the Fv/Fm value obtained in step (ii) and the phytochemical content. In general, a relatively small chlorophyll fluorescence value of a plant indirectly indicates that the plant is under stress. In addition, an appropriate amount of stress (appropriate chlorophyll fluorescence value) may cause increase in phytochemical content of plants.

In the method of determining stress in the plant, the stress may include UV stress, temperature stress (air temperature, root temperature), water stress (water deficiency, hypoxia), light stress (light quality, light intensity), salt stress, and ozone stress.

In the method of determining stress in the plant, the stress characteristics may include the intensity, duration, frequency, and persistence of the stress.

The method of determining stress in the plant according to the present disclosure may further include (iv) adjusting the stress characteristics of the plant such that the chlorophyll fluorescence value is in the range of 0.6 to less than 0.75 to increase the content of the phytochemicals.

In the method of determining stress in the plant, the plant may be a leafy vegetable or a medicinal plant. For example, the plant may include kale, Chinese cabbage, lettuce, mallow, crown daisy, cabbage, celery, spinach, beetroot, bok choy, chicory, asparagus, vegetables for wraps, and herbs, without being limited thereto.

In the method of determining stress in the plant, the phytochemicals may include carotenoids, flavonoids, and phenols, without being limited thereto.

According to the method of determining stress in the plant to increase the content of the phytochemicals in the plant, the stress characteristics of the plant, for example, the intensity, duration, frequency, or persistence of the stress, can be determined by estimating the content of the phytochemicals in the plant based on the value of chlorophyll fluorescence emitted from the plant. Thus, the method of determining stress in the plant can be advantageously used in determining stress applied to various plants to increase the phytochemical content of the plants.

Kale

FIG. 1 shows results of determining relations between UV irradiation and maximum quantum yield according to one embodiment of the present disclosure.

Figure 1B:
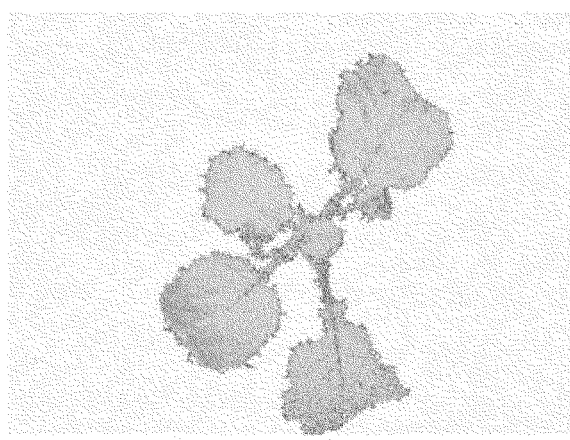

A kale sample as shown in FIG. 1B was subjected to Ultraviolet A ("UVA") irradiation at an irradiance of 50 W/m$^2$ for 3 hours using a UVA-light emitting diode ("LED") (peak wavelength: 365 nm), followed by measurement of a maximum quantum yield of the kale sample.

Chlorophyll fluorescence from a plant is a phenomenon in which some portion of light energy not used in photochemical reaction in the early stages of photosynthesis is emitted again in the form of light.

The maximum quantum yield refers to a maximum value of quantum yield of the photochemical reaction. That is, the maximum quantum yield represents maximum photosynthetic performance of the plant.

The value, "Fm" refers to a maximum value of saturating light-induced fluorescence from a dark-adapted plant. That is, Fm is a value of fluorescence emitted from a plant when light energy used in photosynthesis is zero.

The value, "Fv" refers to a value of light-adapted variable fluorescence from a plant. Specifically, Fv is a value obtained by subtracting a baseline fluorescence value from the maximum fluorescence value. When a plant under dark conditions is irradiated with light, fluorescence from the plant increases instantaneously and then decreases to a constant value. The baseline fluorescence value refers to this constant value.

In general, a healthy plant has a maximum quantum yield in the range of 0.75 to 0.83. A plant that is unhealthy due to damage to a reaction center of photosystem II or due to a stressful environment has a relatively low maximum quantum yield. The level of stress in a plant may be determined from the measured maximum quantum yield of the same plant.

In this embodiment, the maximum quantum yield of the kale sample was measured using a chlorophyll fluorescence meter. The chlorophyll fluorescence meter is configured to measure the maximum quantum yield of a plant by acquiring a fluorescence image of the plant and analyzing the acquired fluorescence image.

A control sample as shown in FIG. 1A had a maximum quantum yield of 0.75 to 0.83, whereas the kale sample subjected to UVA irradiation as shown in FIG. 1B had a maximum quantum yield of 0.4 to 0.7. Therefore, it can be seen that the level of stress in a plant subjected to UVA irradiation can be estimated based on measurement of the maximum quantum yield of the plant.

Figure 2:
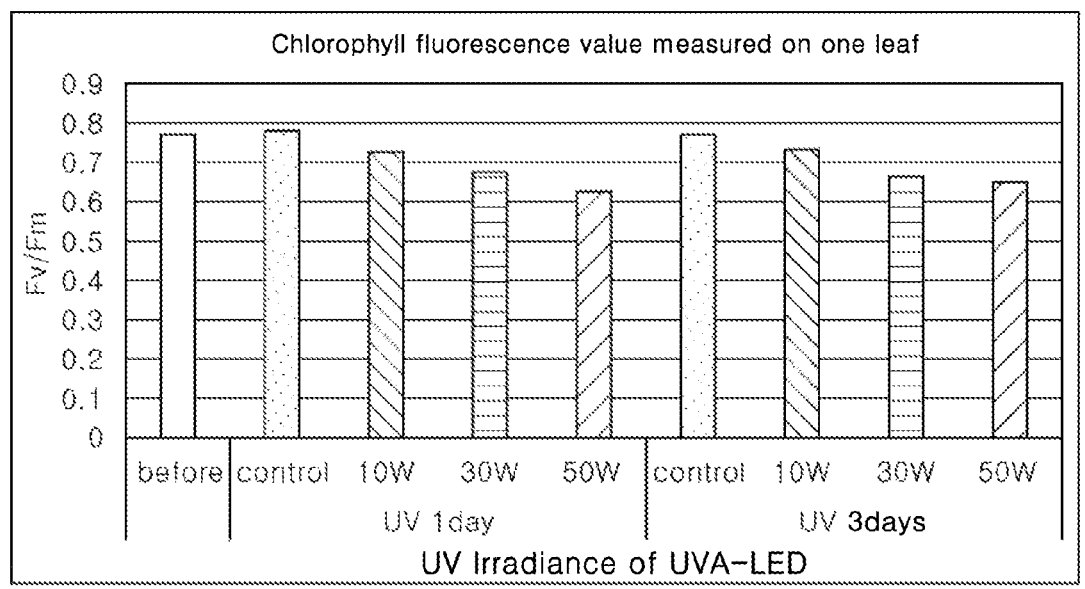
FIG. 2 shows results of determining changes in a maximum quantum yield depending on the intensity and a period of UV irradiation according to one embodiment of the present disclosure.

FIG. 2 shows results of determining changes in a maximum quantum yield depending upon the intensity and period of UV irradiation according to one embodiment of the present disclosure.

Kale samples were subjected to UV irradiation at irradiances of 10 W/m$^2$, 30 W/m$^2$, and, 50 W/m$^2$, respectively, for 3 days using a UVA-LED (peak wavelength: 365 nm). Here, one leaf of each kale sample was secured parallel to the ground surface to be uniformly irradiated with UV, and change in the maximum quantum yield was determined on day 1 and day 3 of UV irradiation.

The result shows that the maximum quantum yield decreased with increasing UV irradiation intensity (10 W/m$^2$<30 W/m$^2$<50 W/m$^2$).

FIG. 3 to FIG. 8 show results of determining changes in phytochemical content depending on the maximum quantum yield according to the teachings of the present disclosure.

Figure 3:
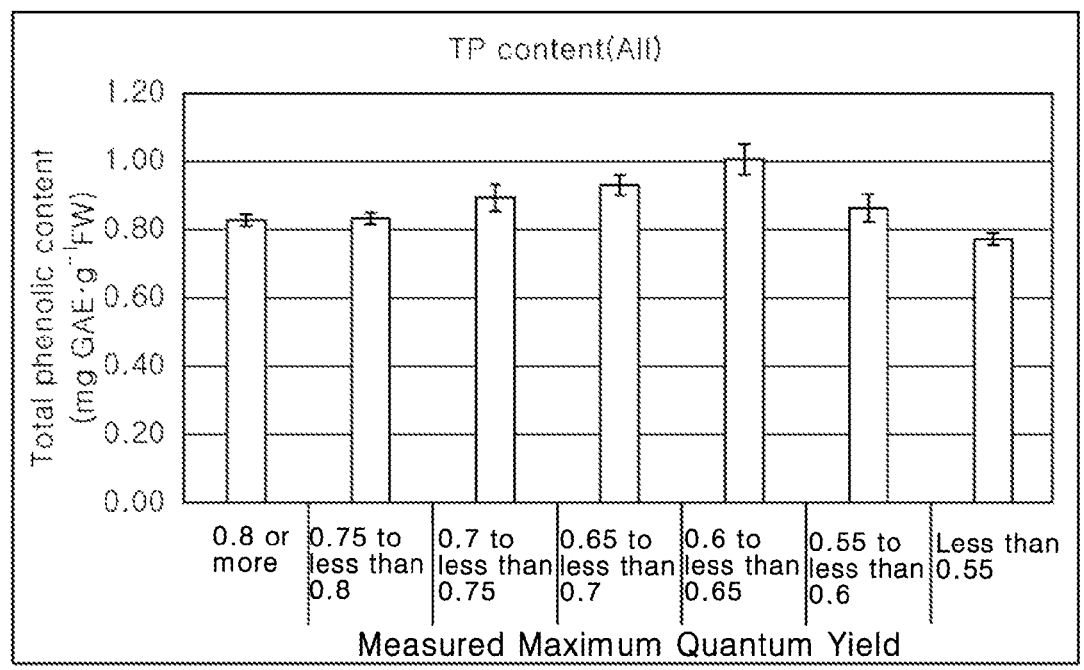
FIG. 3 to FIG. 8 show results of determining changes in phytochemical content depending on the maximum quantum yield according to one embodiment of the present disclosure, where.
Figure 4:
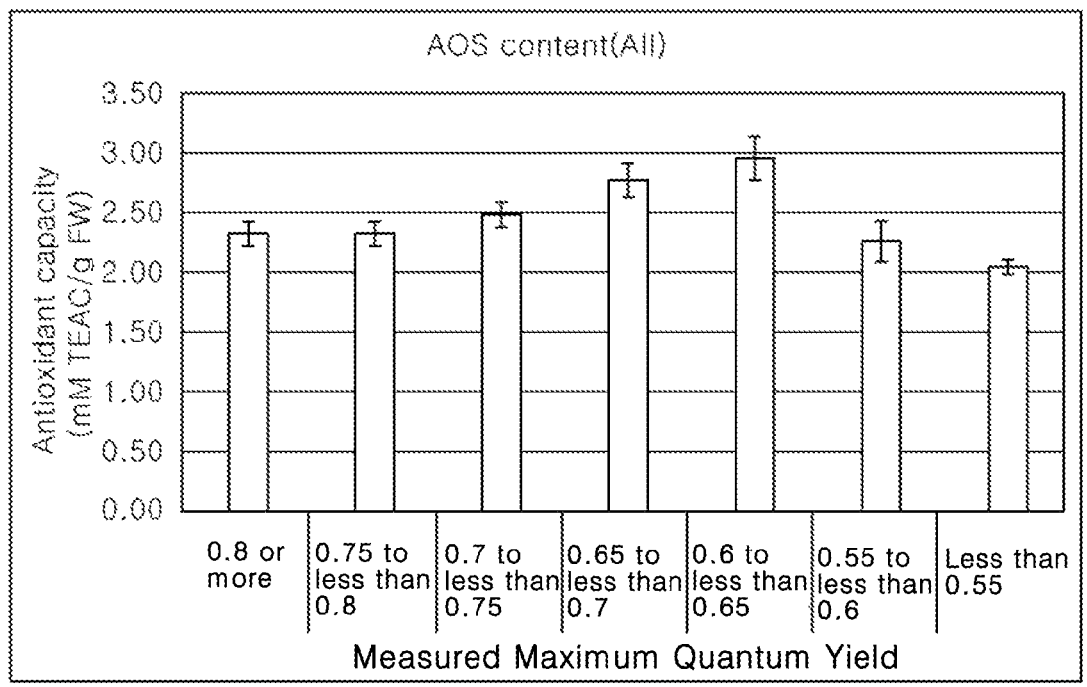
Figure 5:
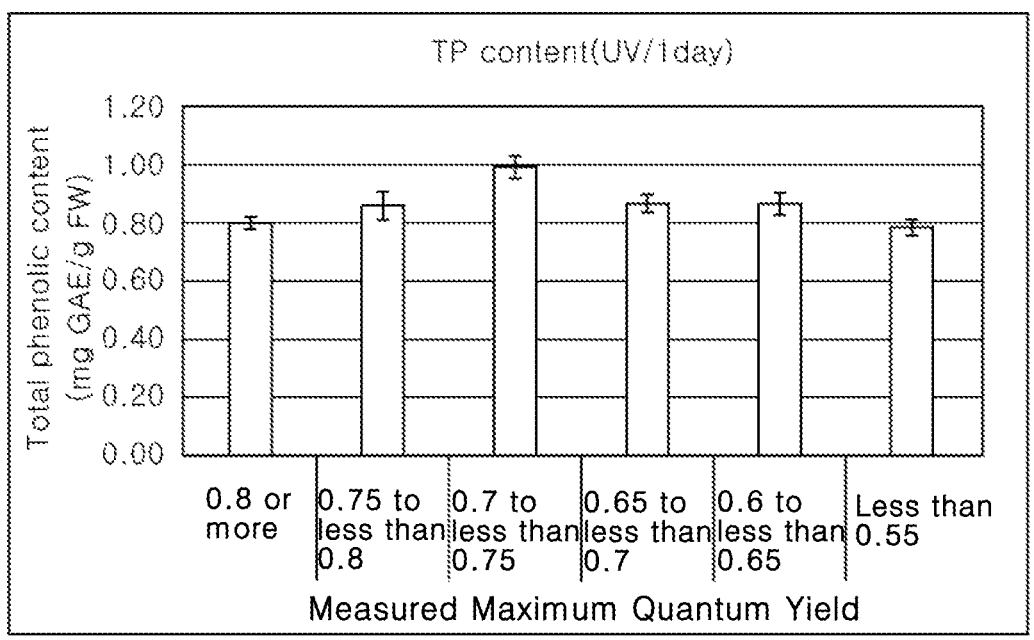
Figure 6:
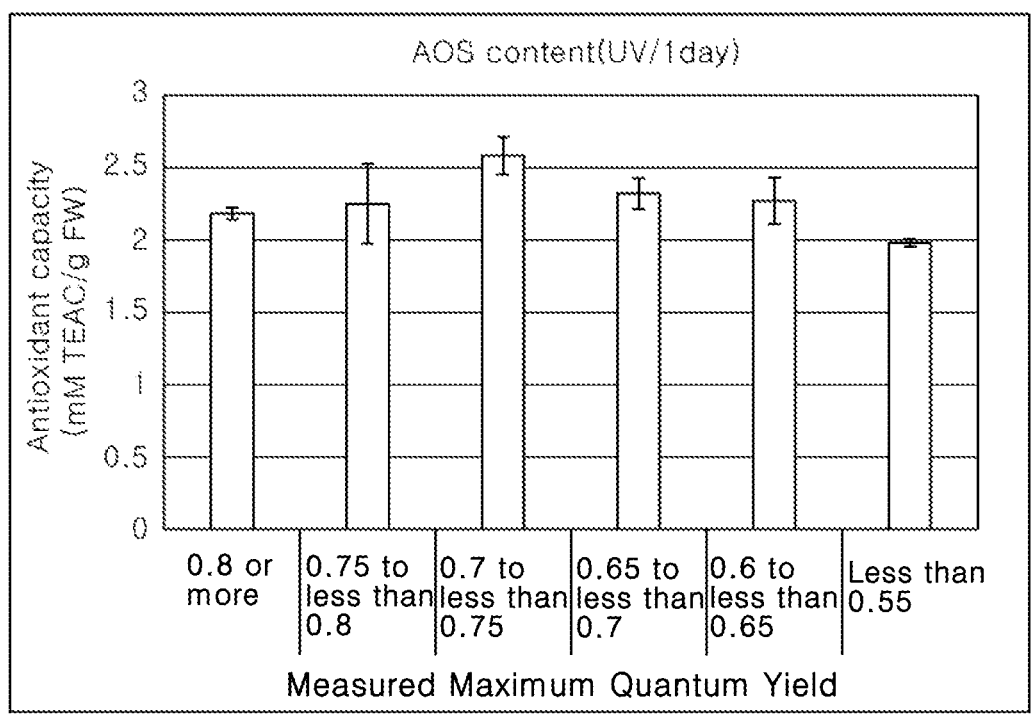
Figure 7:
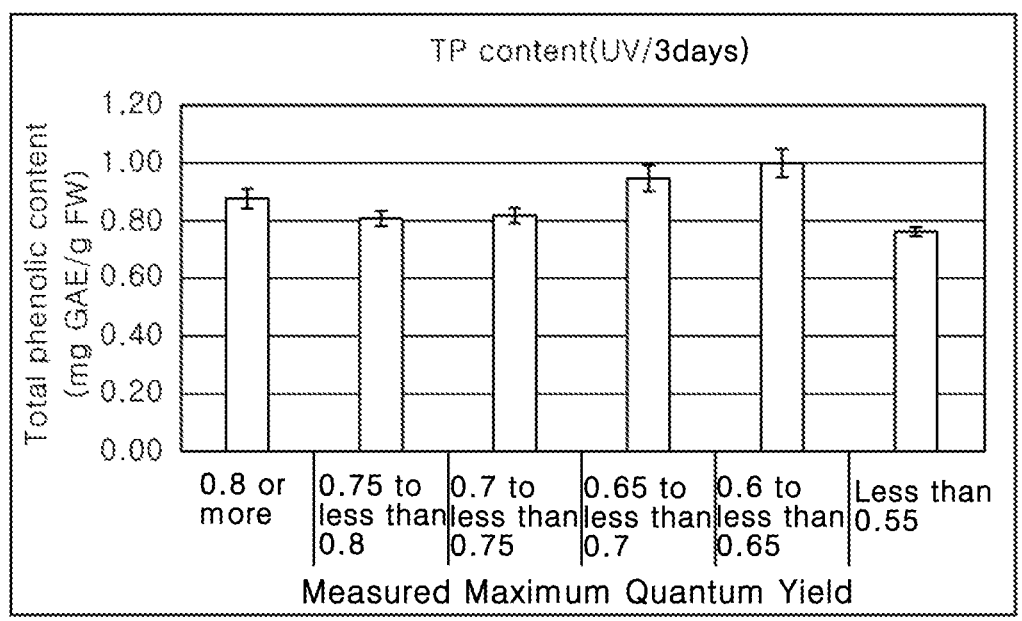
Figure 8:
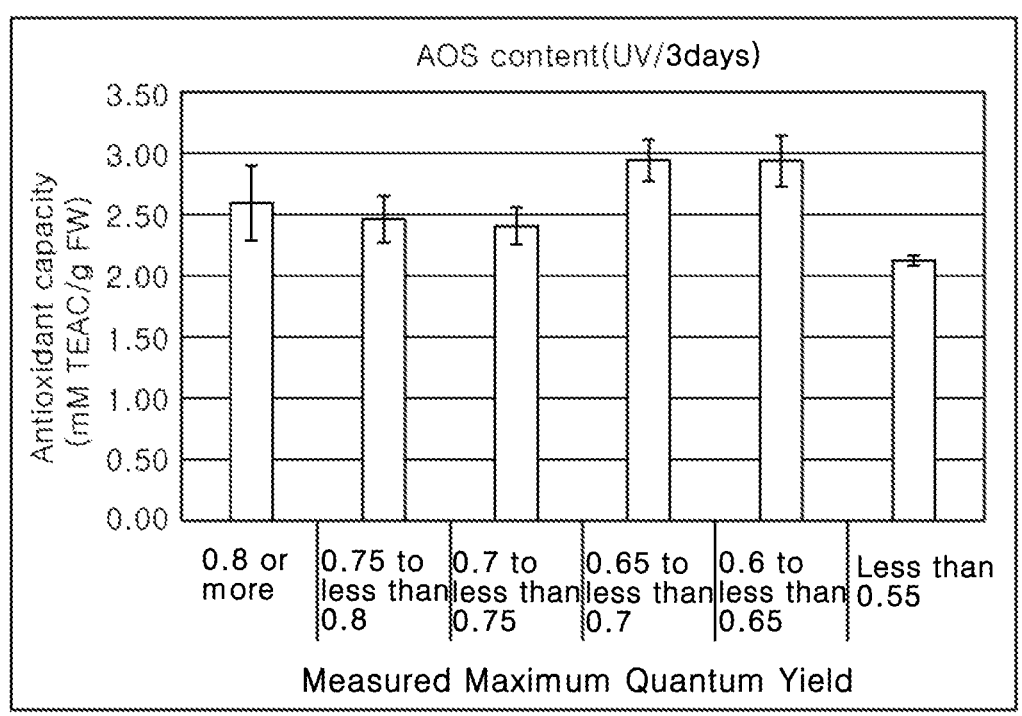

In order to determine changes in phytochemical content depending on the chlorophyll fluorescence value, kale samples were subjected to UV irradiation at irradiances of 10 W/m$^2$, 30 W/m$^2$, and 50 W/m$^2$, respectively, for 3 days using a UVA-LED (peak wavelength: 365 nm), and the maximum quantum yields of leaves of the kale samples were measured on day 1 and day 3 of UV irradiation. The measured maximum quantum yields were divided into groups of less than 0.55, 0.55 to less than 0.6, 0.6 to less than 0.65, 0.65 to less than 0.7, 0.7 to less than 0.75, 0.75 to less than 0.8, and 0.8 or more. The total phenolic content and antioxidant capacity of the kale samples were measured for each of the above numerical ranges. The total phenol content and antioxidant capacity measured on "all days" are as shown in FIGS. 3-4, on day 1 as shown in FIGS. 5-6, and day 3 as shown in FIGS. 7-8, respectively. Here, "all days" refers to the total phenol content and antioxidant capacity measured on day 1 and day 3.

As shown in FIGS. 3-4, the total phenolic content and antioxidant capacity measured on "all days" of UV irradiation both significantly increased in the maximum quantum yield range of 0.6 to less than 0.65. On the other hand, the total phenolic content and antioxidant capacity measured on day 1 of UV irradiation both significantly increased in the maximum quantum yield range of 0.7 to less than 0.75 (FIG. 5 and FIG. 6). The total phenolic content and antioxidant capacity measured on day 3 of UV irradiation both increased in the maximum quantum yield range of 0.6 to less than 0.65 (FIG. 7 and FIG. 8). On day 1 of UV irradiation, since the plant was more susceptible to stress caused by UV light than on the following days, the phytochemical content of the plant increased in the maximum quantum yield range of 0.7 to less than 0.75. On day 3 of UV irradiation, since the plant exposed to UV radiation for three days adapted to the UV radiation environment, more stress was needed to increase the phytochemical content of the plant.

Kale Cultivation 1

Kale samples were planted in a closed plant production system at 20° C. and 60% RH, followed by cultivation for three weeks. During cultivation, the kale samples were irradiated with white/red mixed light at a PPFD of 130±5 µmol/m$^2$/s at intervals of 12 hours. Here, the ratio of white light to red light in the mixed light was 9:1. In addition, Hoagland & Arnon solution (pH: 6.0, EC: 1.0 mS/cm) was used as a culture medium.

After cultivating the kale samples in the plant production system, the kale samples were treated with supplemental UV lighting for three days. Here, light in the UVA region was used as the UV light.

Figure 9:
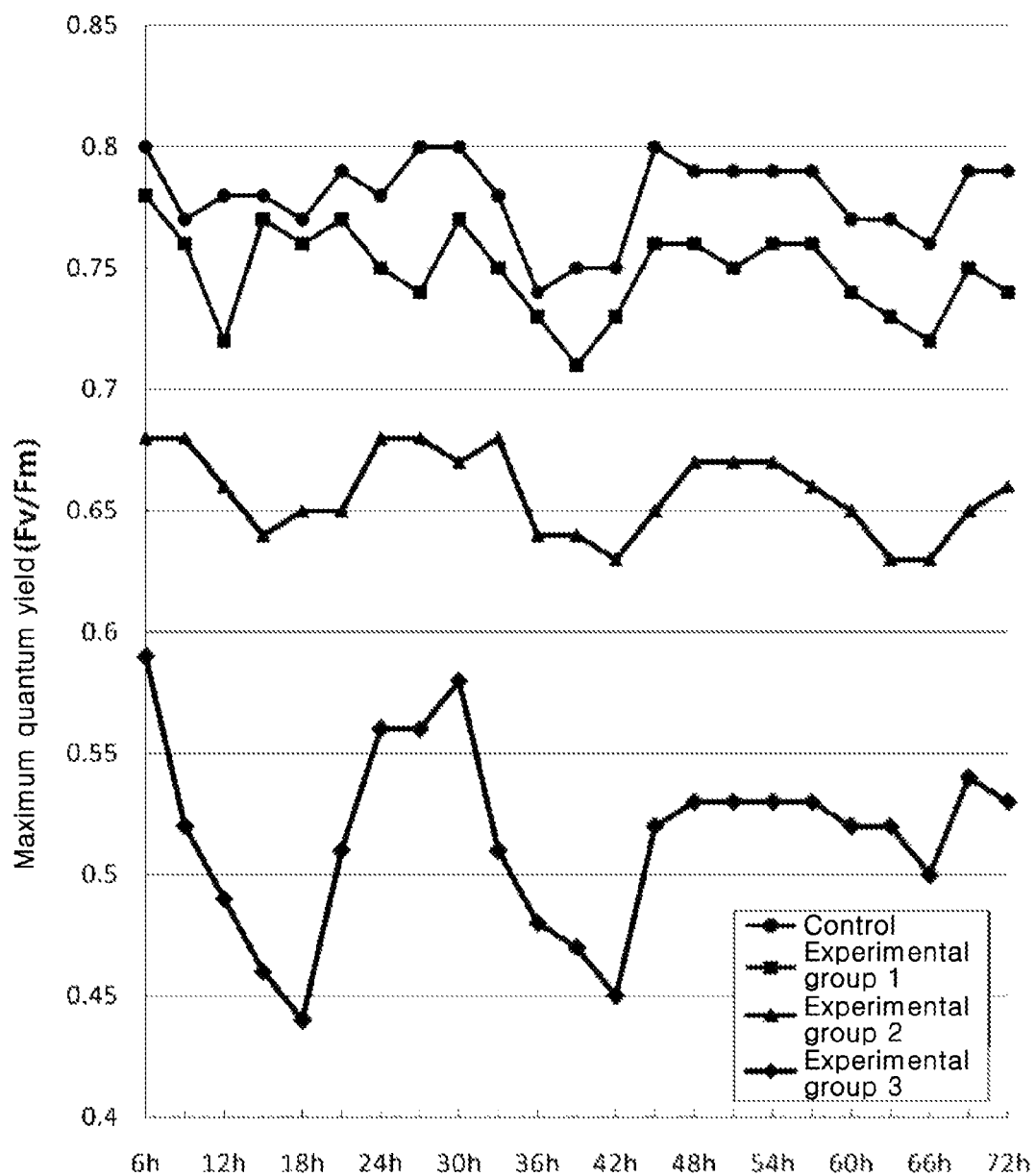
FIG. 9 is a graph showing maximum quantum yield (Fv/Fm) values of kale measured during supplemental UVA lighting treatment for 3 days.

FIG. 9 is a graph showing the maximum quantum yields (Fv/Fm) of the kale samples measured during supplemental UVA lighting treatment for 3 days.

Specifically, FIG. 9 shows the maximum quantum yields measured on a control group composed of kale samples not subjected to UV irradiation, experimental group 1 composed of kale samples subjected to UV irradiation at an irradiance of 10 W/m$^2$, experimental group 2 composed of kale samples subjected to UV irradiation at an irradiance of 30 W/m$^2$, and experimental group 3 composed of kale samples subjected to UV irradiation at an irradiance of 50 W/m$^2$. The maximum quantum yields of the control group and experimental groups 1 to 3 were measured every 3 hours, starting from 6 hours after beginning of supplemental UVA lighting.

Table 1 shows the maximum quantum yield values plotted in the graph of FIG. 9.

TABLE 1

Maximum quantum yield values of FIG. 9

| Measurement point in time (h) | Control group | Experimental group 1 | Experimental group 2 | Experimental group 3 |
|---|---|---|---|---|
| 6 | 0.8 | 0.78 | 0.68 | 0.59 |
| 9 | 0.77 | 0.76 | 0.68 | 0.52 |
| 12 | 0.78 | 0.72 | 0.66 | 0.49 |
| 15 | 0.78 | 0.77 | 0.64 | 0.46 |
| 18 | 0.77 | 0.76 | 0.65 | 0.44 |
| 21 | 0.79 | 0.77 | 0.65 | 0.51 |
| 24 | 0.78 | 0.75 | 0.68 | 0.56 |
| 27 | 0.8 | 0.74 | 0.68 | 0.56 |
| 30 | 0.8 | 0.77 | 0.67 | 0.58 |
| 33 | 0.78 | 0.75 | 0.68 | 0.51 |
| 36 | 0.74 | 0.73 | 0.64 | 0.48 |
| 39 | 0.75 | 0.71 | 0.64 | 0.47 |
| 42 | 0.75 | 0.73 | 0.63 | 0.45 |
| 45 | 0.8 | 0.76 | 0.65 | 0.52 |
| 48 | 0.79 | 0.76 | 0.67 | 0.53 |
| 51 | 0.79 | 0.75 | 0.67 | 0.53 |
| 54 | 0.79 | 0.76 | 0.67 | 0.53 |
| 57 | 0.79 | 0.76 | 0.66 | 0.53 |
| 60 | 0.77 | 0.74 | 0.65 | 0.52 |
| 63 | 0.77 | 0.73 | 0.63 | 0.52 |
| 66 | 0.76 | 0.72 | 0.63 | 0.5 |
| 69 | 0.79 | 0.75 | 0.65 | 0.54 |
| 72 | 0.79 | 0.74 | 0.66 | 0.53 |

Referring to FIG. 9 and Table 1, the control group had a maximum quantum yield (Fv/Fm) of 0.75 to 0.8. The first measured maximum quantum yield of the control group was 0.8 and the last measured maximum quantum yield of the control group 1 was 0.79, which was lower than the first measured maximum quantum yield. Experimental group 1 had a maximum quantum yield of 0.71 to 0.78. The first measured maximum quantum yield of experimental group 1 was 0.78 and the last measured maximum quantum yield of experimental group 1 was 0.74, which was lower than the first measured maximum quantum yield. Experimental group 2 had a maximum quantum yield of 0.63 to 0.68. The first measured maximum quantum yield of experimental group 2 was 0.68 and the last measured maximum quantum yield of experimental group 2 was 0.66, which was lower than the first measured maximum quantum yield.

Experimental group 3 had a maximum quantum yield of 0.44 to 0.59. The first measured maximum quantum yield of experimental group 3 was 0.59 and the last measured maximum quantum yield of experimental group 3 was 0.53, which was lower than the first measured maximum quantum yield.

Therefore, it can be seen that the maximum quantum yield of a plant decreases with increasing intensity of UVA radiation to which the plant is exposed.

Figure 10:
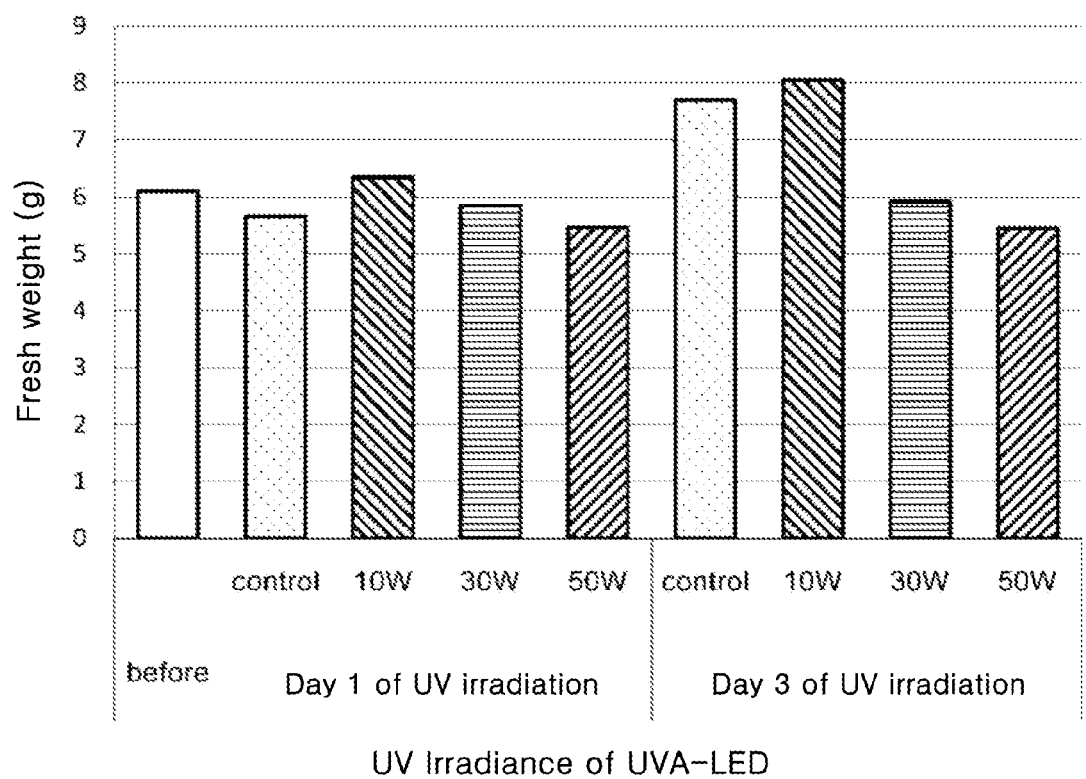
FIG. 10 is a graph showing the fresh weight of kale during supplemental UVA lighting treatment.
Figure 11:
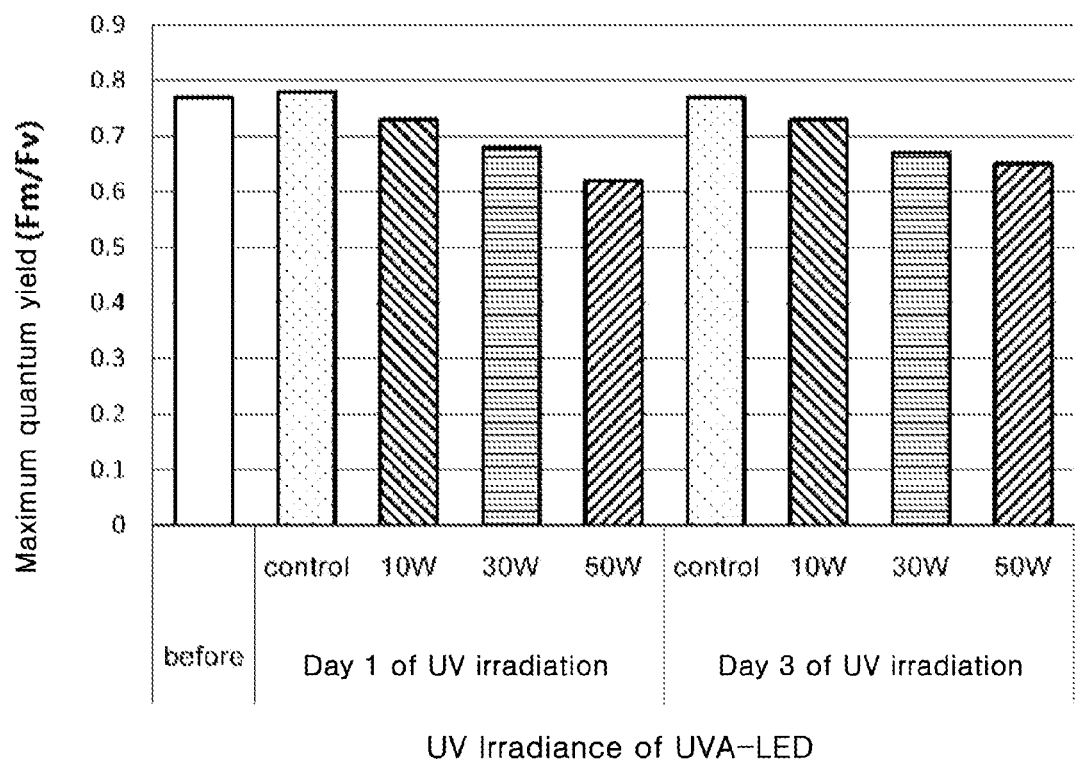
FIG. 11 is a graph showing the maximum quantum yield of kale during supplemental UVA lighting treatment.

FIG. 10 is a graph showing the fresh weight of kale samples during treatment with supplemental UVA lighting. FIG. 11 is a graph showing the maximum quantum yield of kale samples during treatment with supplemental UVA lighting.

FIG. 10 shows the fresh weight of kale samples measured on day 1 and day 3 of the supplemental UVA lighting treatment.

Table 2 shows the fresh weight per plant and maximum quantum yield of the kale samples on day 1 and day 3 of treatment with supplemental UVA lighting.

TABLE 2

Fresh weight per plant and maximum quantum yield of kale

| | | Fresh weight | Maximum quantum yield |
|---|---|---|---|
| Before UV irradiation | | 6.10 | 0.77 |
| Day 1 of UV irradiation | Control group | 5.67 | 0.78 |
| | Experimental group 1 (10 W) | 6.35 | 0.73 |
| | Experimental group 2 (30 W) | 5.85 | 0.68 |
| | Experimental group 3 (50 W) | 5.47 | 0.62 |
| Day 3 of UV irradiation | Control group | 7.71 | 0.77 |
| | Experimental group 1 (10 W) | 8.06 | 0.73 |
| | Experimental group 2 (30 W) | 5.93 | 0.67 |
| | Experimental group 3 (50 W) | 5.46 | 0.65 |

From FIG. 10 and Table 2, changes in fresh weight between day 1 of UVA irradiation and day 3 of UVA irradiation can be determined. The control group and experimental groups 1 to 3 of the kale samples all had a fresh weight of 6.10 before UVA irradiation. The control group had a fresh weight of 5.67 on day 1 of UVA irradiation and a fresh weight of 7.71 on day 3 of UVA irradiation. The fresh weight of the control group decreased by 0.43 on day 1 of UVA irradiation and increased by 2.04 on day 3 of UVA irradiation. That is, the fresh weight of the control group increased on day 3 of UVA irradiation was 1.61 greater than that before UVA irradiation.

Experimental group 1 had a fresh weight of 6.35 on day 1 of UVA irradiation and a fresh weight of 8.06 on day 3 of UVA irradiation. The fresh weight of experimental group 1 increased by 0.25 on day 1 of UVA irradiation and increased by 1.71 on day 3 of UVA irradiation. That is, the fresh weight of experimental group 1 on day 3 of UVA irradiation was 1.96 greater than that of before UVA irradiation.

Experimental group 2 had a fresh weight of 5.85 on day 1 of UVA irradiation and a fresh weight of 5.93 on day 3 of UVA irradiation. The fresh weight of experimental group 2 decreased by 0.25 on the first day of UVA irradiation and increased by 0.08 on the third day of UVA irradiation. That is, the fresh weight of experimental group 2 on day 3 of UVA irradiation was 0.17 smaller than that of before UVA irradiation.

Experimental group 3 had a fresh weight of 5.74 on day 1 of UVA irradiation and a fresh weight of 5.46 on day 3 of UVA irradiation. The fresh weight of experimental group 1 increased by 0.63 on day 1 of UVA irradiation and decreased by 0.01 on day 3 of UVA irradiation. That is, the fresh weight of experimental group 1 on day 3 of UVA irradiation was 0.64 smaller than that of before UVA irradiation.

From FIG. 11 and Table 2, changes in the maximum quantum yield between day 1 of UVA irradiation and day 3 of UVA irradiation can be determined.

The control group and experimental groups 1 to 3 had a maximum quantum yield of 0.77 before UVA irradiation.

The control group had a maximum quantum yield of 0.78 on day 1 of UVA irradiation and a maximum quantum yield of 0.77 on day 3 of UVA irradiation. The maximum quantum yield of the control group increased by 0.1 on day 1 of UVA irradiation and decreased by 0.1 on day 3 of UVA irradiation. That is, the maximum quantum yield of the control group on day 3 of UVA irradiation was the same as that before UVA irradiation.

Experimental group 1 had a maximum quantum yield of 0.73 on day 1 of UVA irradiation and a maximum quantum yield of 0.73 on day 3 of UVA irradiation. The maximum quantum yield of experimental group 1 decreased by 0.04 on day 1 of UVA irradiation and did not change on day 3 of UVA irradiation. That is, the maximum quantum yield of experimental group 1 on day 3 of UVA irradiation was 0.04 lower than that before UVA irradiation.

Experimental group 2 had a maximum quantum yield of 0.68 on day 1 of UVA irradiation and a maximum quantum yield of 0.67 on day 3 of UVA irradiation. The maximum quantum yield of experimental group 2 decreased by 0.09 on day 1 of UVA irradiation and decreased by 0.01 on day 3 of UVA irradiation. That is, the maximum quantum yield of experimental group 2 on the third day of UVA irradiation was 0.1 lower than that before UVA irradiation.

Experimental group 3 had a maximum quantum yield of 0.62 on day 1 of UVA irradiation and a maximum quantum yield of 0.65 on day 3 of UVA irradiation. The maximum quantum yield of experimental group 1 decreased by 0.15 on day 1 of UVA irradiation and increased by 0.03 on day 3 of UVA irradiation. That is, the maximum quantum yield of experimental group 1 on the third day of UVA irradiation was 0.12 smaller than that before UVA irradiation.

Referring to FIG. 10, FIG. 11 and Table 2, supplemental UVA lighting treatment caused increase or insignificant decrease in fresh weight of kale, as compared with before supplemental UVA lighting treatment. In addition, supplemental UVA lighting treatment caused decrease in maximum quantum yield of kale, as compared with before treatment with supplemental UVA lighting.

Therefore, it can be seen that even when a plant is under stress due to UVA irradiation, growth of the plant can be maintained or improved.

Tables 3 to 5 show the maximum quantum yield, total phenolic content, and antioxidant capacity of the kale samples, as measured before supplemental UVA lighting treatment, on day 1 of supplemental UVA lighting treatment, and on day 3 of supplemental UVA lighting treatment, respectively.

Each experiment was performed using four kale samples. After supplemental UVA lighting treatment, two specimens were taken from each kale sample, followed by measurement of the maximum quantum yield, total phenolic content, and antioxidant capacity of each specimen.

TABLE 3

Maximum quantum yield, total phenolic content, and antioxidant capacity of kale before supplemental UVA lighting treatment

| Before supplemental UVA lighting treatment | Fv/Fm 1 | Fv/Fm 2 | TP 1 | TP 2 | AOS 1 | AOS 2 |
|---|---|---|---|---|---|---|
| 1 | 0.78 | — | 0.88 | — | 2.13 | — |
| 2 | 0.77 | — | 0.87 | — | 2.15 | — |
| 3 | 0.76 | — | 0.84 | — | 2.09 | — |
| 4 | 0.77 | — | 0.76 | — | 1.81 | — |

TABLE 4

Maximum quantum yield, total phenolic content, and antioxidant capacity of kale on day 1 of supplemental UVA lighting treatment

| Day 1 of supplemental UVA lighting treatment | | Fv/Fm 1 | Fv/Fm 2 | TP 1 | TP 2 | AOS 1 | AOS 2 |
|---|---|---|---|---|---|---|---|
| Control group | 1 | 0.80 | 0.80 | 0.82 | 0.77 | 2.07 | 2.18 |
| | 2 | 0.81 | 0.80 | 0.80 | 0.89 | 2.19 | 2.41 |
| | 3 | 0.80 | 0.80 | 0.76 | 0.80 | 2.05 | 2.06 |
| | 4 | 0.80 | 0.79 | 0.78 | 0.79 | 2.08 | 2.25 |
| Experimental group 1 (10 W) | 1 | 0.76 | 0.74 | 0.90 | 1.10 | 2.54 | 2.82 |
| | 2 | 0.78 | 0.77 | 0.72 | 0.76 | 1.90 | 2.03 |
| | 3 | 0.76 | 0.74 | 0.84 | 0.85 | 2.08 | 2.74 |
| | 4 | 0.76 | 0.74 | 1.03 | 1.00 | 2.54 | 2.84 |
| Experimental group 2 (30 W) | 1 | 0.71 | 0.72 | 1.07 | 0.99 | 2.89 | 2.86 |
| | 2 | 0.75 | 0.68 | 0.90 | 0.92 | 2.34 | 2.67 |
| | 3 | 0.65 | 0.57 | 0.79 | 0.84 | 2.16 | 2.07 |
| | 4 | 0.49 | 0.66 | 0.81 | 0.79 | 1.98 | 2.04 |
| Experimental group 3 (50 W) | 1 | 0.69 | 0.60 | 0.91 | 0.98 | 2.35 | 2.77 |
| | 2 | 0.52 | 0.58 | 0.76 | 0.74 | 1.94 | 1.77 |
| | 3 | 0.59 | 0.72 | 0.87 | 0.92 | 2.30 | 1.80 |
| | 4 | 0.66 | 0.56 | 0.91 | 0.89 | 2.27 | 2.35 |

TABLE 5

Maximum quantum yield, total phenolic content, and antioxidant capacity of kale on day 3 of supplemental UVA lighting treatment

| Day 3 of supplemental UVA lighting treatment | | Fv/Fm 1 | Fv/Fm 2 | TP 1 | TP 2 | AOS 1 | AOS 2 |
|---|---|---|---|---|---|---|---|
| Control group | 1 | 0.79 | 0.78 | 0.69 | 0.70 | 1.79 | 2.03 |
| | 2 | 0.80 | 0.79 | 0.94 | 0.92 | 3.45 | 3.06 |
| | 3 | 0.79 | 0.79 | 0.83 | 0.91 | 2.32 | 2.18 |
| | 4 | 0.80 | 0.80 | 0.91 | 0.80 | 2.17 | 2.25 |
| Experimental group 1 (10 W) | 1 | 0.68 | 0.75 | 0.72 | 0.84 | 2.36 | 3.42 |
| | 2 | 0.74 | 0.73 | 0.84 | 0.87 | 2.92 | 2.38 |
| | 3 | 0.71 | 0.75 | 0.82 | 0.77 | 2.22 | 2.06 |
| | 4 | 0.73 | 0.75 | 0.91 | 0.83 | 2.95 | 3.00 |
| Experimental group 2 (30 W) | 1 | 0.63 | 0.69 | 1.05 | 0.99 | 3.10 | 2.71 |
| | 2 | 0.70 | 0.65 | 0.72 | 0.71 | 1.86 | 1.74 |
| | 3 | 0.72 | 0.66 | 0.79 | 0.91 | 2.15 | 2.87 |
| | 4 | 0.68 | 0.65 | 0.90 | 0.77 | 2.41 | 2.20 |
| Experimental group 3 (50 W) | 1 | 0.50 | 0.54 | 0.78 | 0.74 | 2.09 | 2.16 |
| | 2 | 0.64 | 0.67 | 1.05 | 1.10 | 3.16 | 3.27 |
| | 3 | 0.67 | 0.69 | 1.03 | 1.11 | 2.80 | 3.68 |
| | 4 | 0.67 | 0.68 | 1.12 | 1.03 | 3.79 | 3.70 |

Figure 12:
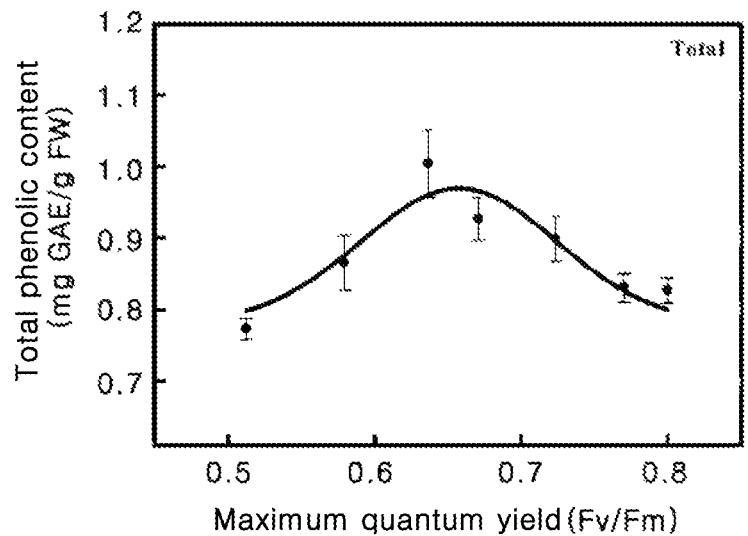
FIG. 12 to FIG. 17 are graphs showing the phytochemical content of kale depending on the maximum quantum yield, where.
Figure 13:
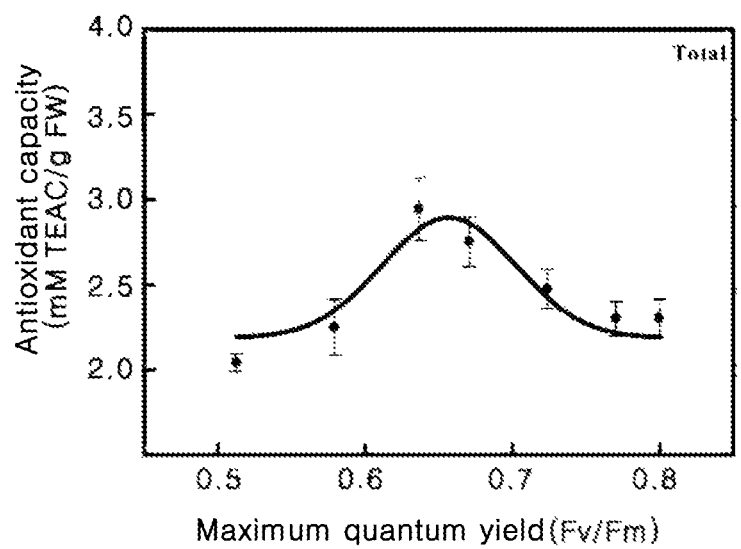

FIG. 12 to FIG. 17 are graphs showing the phytochemical content of kale depending on the maximum quantum yield. Specifically, FIG. 12 and FIG. 13 are graphs showing average trends of the maximum quantum yield-dependent total phenolic content and antioxidant capacity of kale over the total period of supplemental UVA lighting treatment, respectively. Here, the total period refers to day 1+day 2 of supplemental UVA lighting treatment.

Referring to FIG. 12, the total phenolic content of the kale sample as measured over the total period of supplemental UVA lighting treatment is greater than or equal to an average value thereof when the maximum quantum yield of the kale sample has a value of about 0.58 to 0.74.

In addition, referring to FIG. 13, the antioxidant capacity of the kale sample as measured over the total period of supplemental UVA lighting treatment is greater than or equal to an average value thereof when the maximum quantum yield of the kale sample has a value of about 0.6 to 0.72.

That is, the total phenolic content and antioxidant capacity of the kale sample as measured over the total period of supplemental UVA lighting treatment are both above the average value thereof when the maximum quantum yield of the kale sample has a value of about 0.6 to 0.72.

Figure 14:
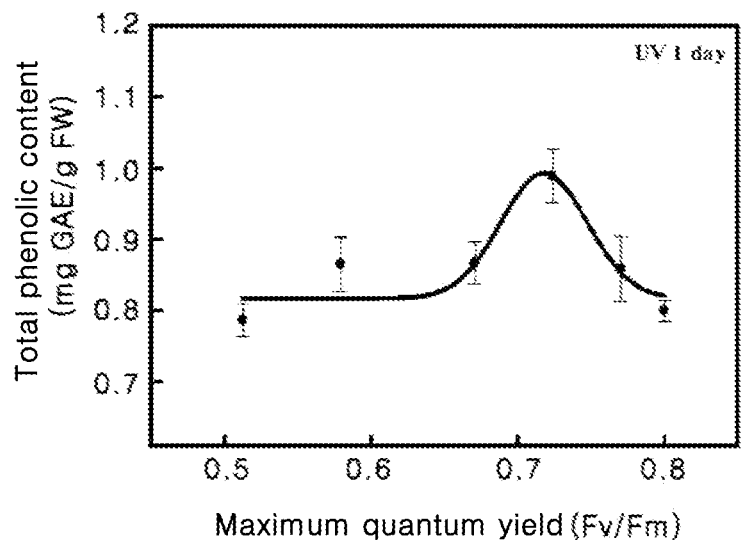
Figure 15:
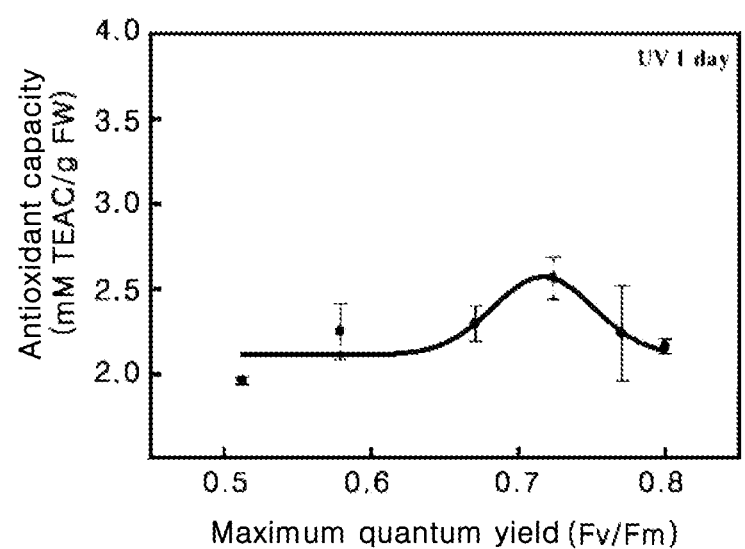

FIG. 14 and FIG. 15 are graphs showing average trends of the maximum quantum yield-dependent total phenolic content and antioxidant capacity of the kale sample on day 1 of supplemental UVA lighting treatment, respectively.

Referring to FIG. 14, the total phenolic content of the kale sample on day 1 of supplemental UVA lighting treatment is above the average value thereof when the maximum quantum yield of the kale sample has a value of about 0.68 to 0.76.

Referring to FIG. 15, the antioxidant capacity of the kale sample on day 1 of supplemental UVA lighting treatment is above the average value thereof when the maximum quantum yield of the kale sample has a value of about 0.67 to 0.76.

That is, the total phenolic content and antioxidant capacity of the kale sample on day 1 of supplemental UVA lighting treatment are both above the average value thereof when the maximum quantum yield of the kale sample has a value of about 0.68 to 0.76.

Figure 16:
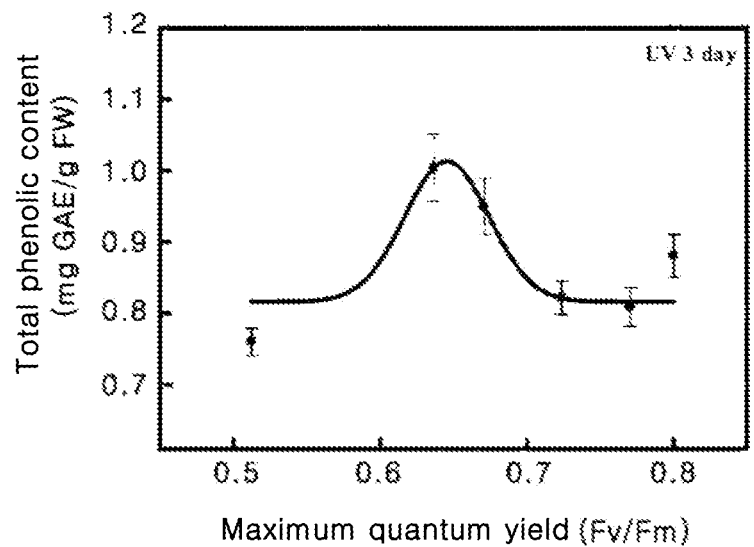
Figure 17:
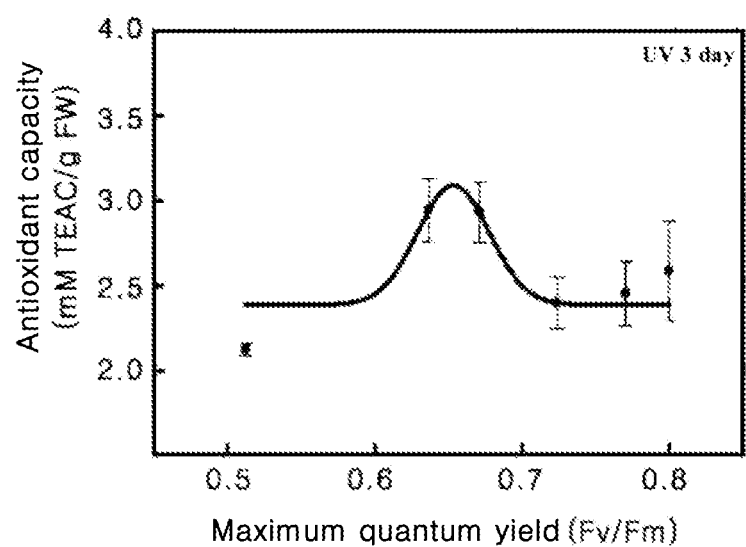

FIG. 16 and FIG. 17 are graphs showing average trends of the maximum quantum yield-dependent total phenolic content and antioxidant capacity of the kale sample on day 3 of supplemental UVA lighting treatment, respectively.

Referring to FIG. 16, the total phenolic content of the kale sample on day 3 of supplemental UVA lighting treatment is above the average value thereof when the maximum quantum yield of the kale sample has a value of about 0.61 to 0.69.

Referring to FIG. 17, the antioxidant capacity of the kale sample on day 3 of supplemental UVA lighting treatment is above the average value thereof when the maximum quantum yield of the kale sample has a value of about 0.62 to 0.69.

That is, the total phenolic content and antioxidant capacity of the kale sample on day 3 of supplemental UVA lighting treatment are both above the average value thereof when the maximum quantum yield of the kale sample has a value of about 0.62 to 0.69.

From FIG. 12 to FIG. 17, it can be seen that the contents of the phytochemicals in the kale sample treated with supplemental UVA lighting are above the average values thereof when the maximum quantum yield of the kale sample has a value of about 0.68 to 0.69.

As such, it is possible to find a point in time at which the phytochemical content of a plant is above the average value thereof by measuring the maximum quantum yield of the plant.

Cultivation of Ice Plant

Seeds of an ice plant were sown in a closed plant production system (temperature 23° C., $CO_2$: 1000 μmol/mol, photoperiod: 12 hours, PPFD: 200 μmol/m²/s, mixed light (red:white:blue=8:1:1), followed by cultivation for 3 weeks, and then seedlings thereof were planted. The planted seedlings were further cultivated for 3 weeks. Then, the obtained ice plant samples were subjected to supplemental lighting treatment with UVA having various wavelengths at an irradiance of 30 W/m² for one week. Here, as a light source for supplemental lighting treatment, UVA LEDs emitting light at wavelengths of 365 nm, 375 nm, 385 nm, and 395 nm and a UVA lamp emitting light in a broad wavelength range including the UVA region were used.

Figure 18:
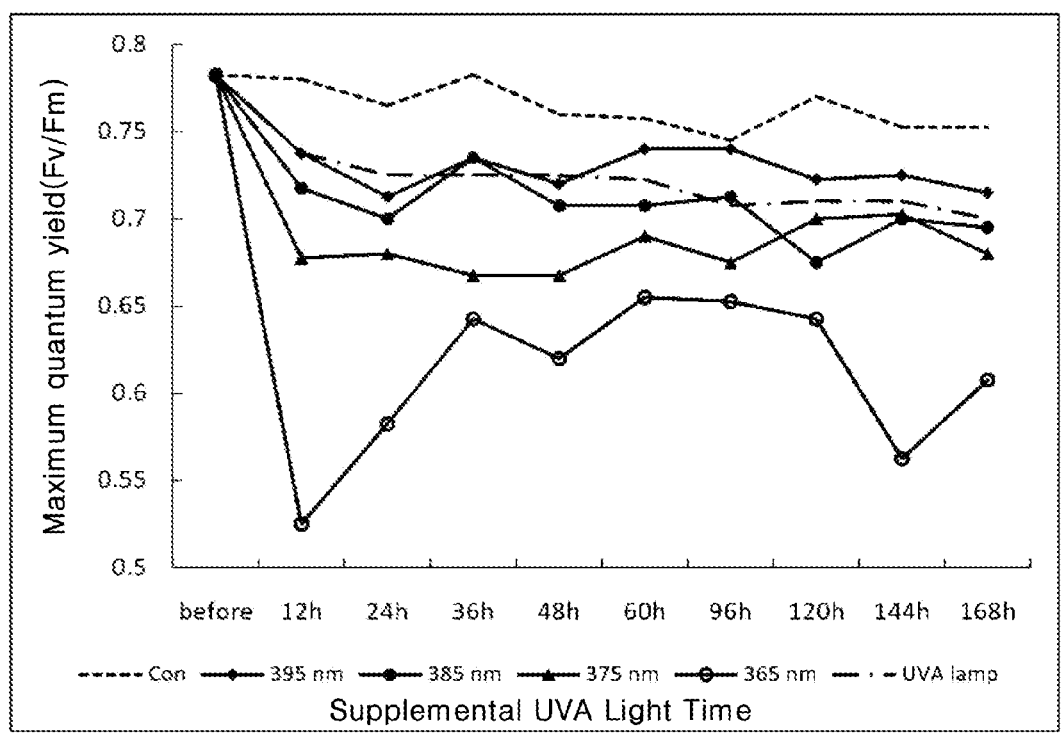
FIG. 18 is a graph showing the maximum quantum yield of an ice plant depending on the supplemental UVA lighting treatment time.

FIG. 18 is a graph showing the maximum quantum yield of the ice plant samples depending on the supplemental UVA lighting time.

Referring to the results on day 7 of UVA irradiation, ice plant samples treated with the 365 nm LED and the 375 nm LED had lower maximum quantum yields than those treated with the 395 nm LED, the 385 nm LED, and the UVA lamp. In addition, the ice plant sample treated with the 365 nm LED had a smaller chlorophyll fluorescence value than the ice plant sample treated with the 375 nm LED. Further, the ice plant samples treated with the 395 nm LED, the 385 nm LED and the UVA lamp had similar chlorophyll fluorescence values.

In addition, an ice plant sample (control group) not subjected to UVA irradiation had a higher chlorophyll fluorescence value than the ice plant samples subjected to UVA irradiation.

Therefore, it can be seen that, regardless of the type of UVA used, UVA irradiation for a certain period of time causes stress to a plant, and UVA irradiation at a shorter wavelength causes more stress to the plant.

Figure 19:
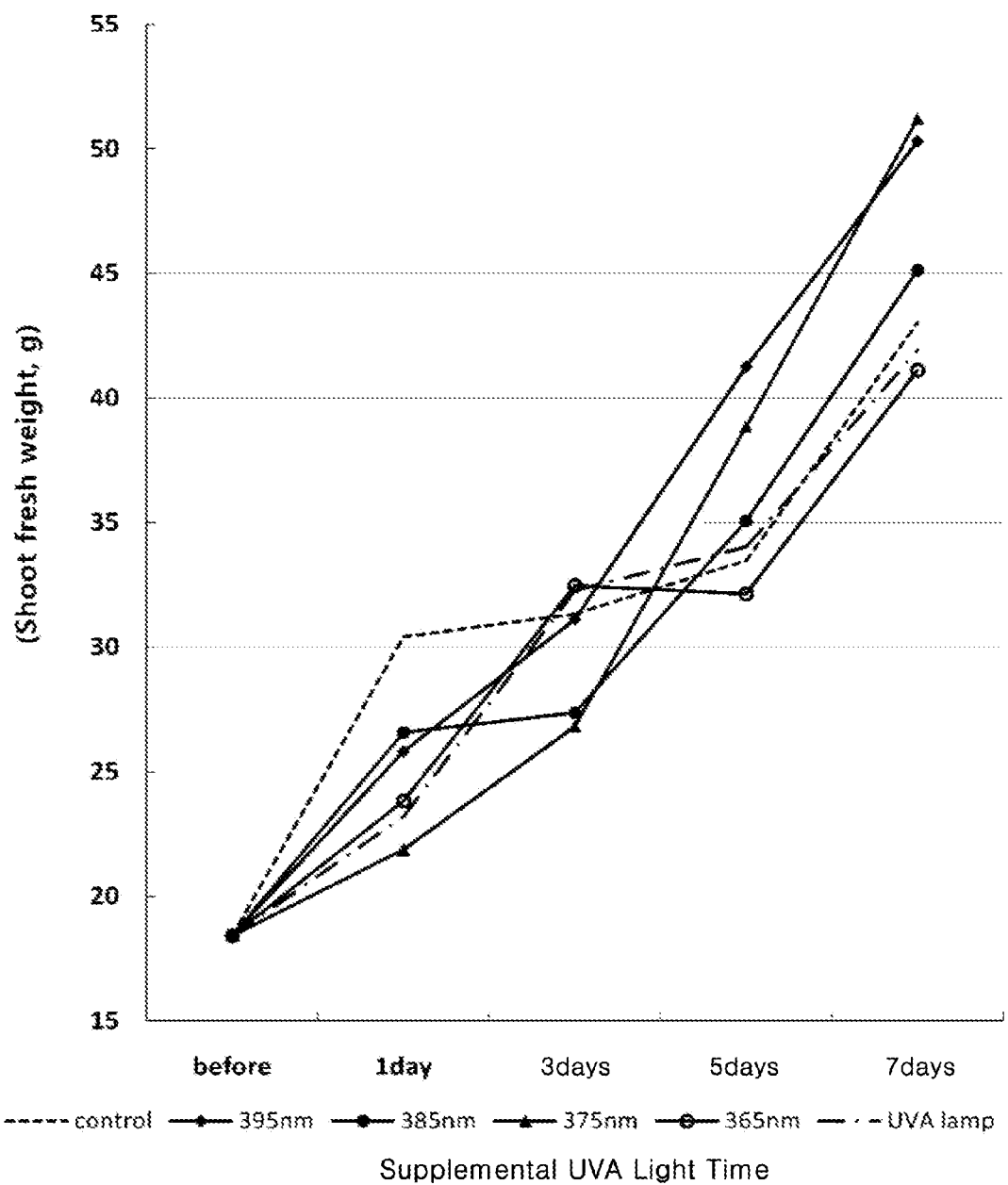
FIG. 19 to FIG. 22 are graphs related to growth of an ice plant, where.
Figure 20:
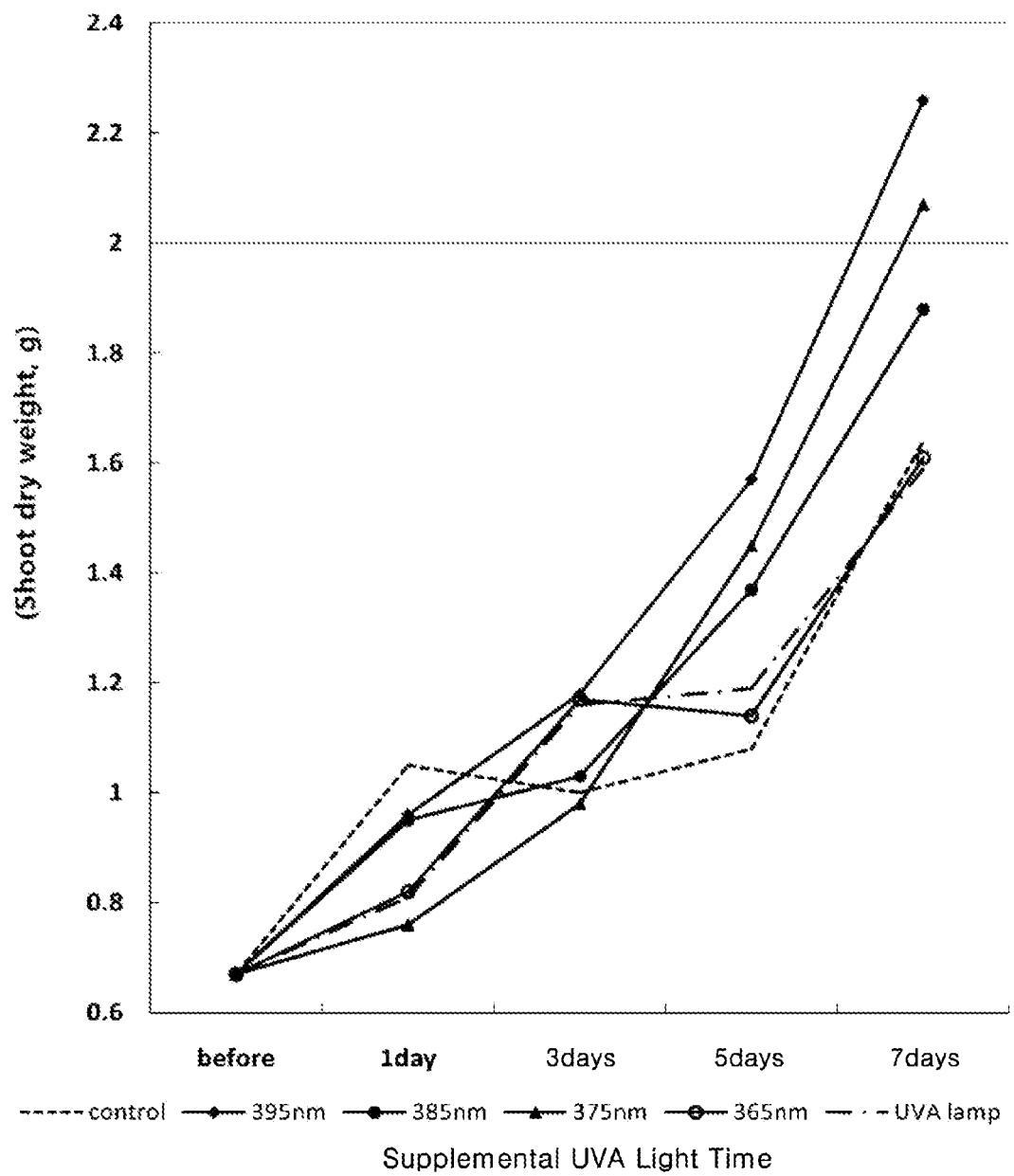
Figure 21:
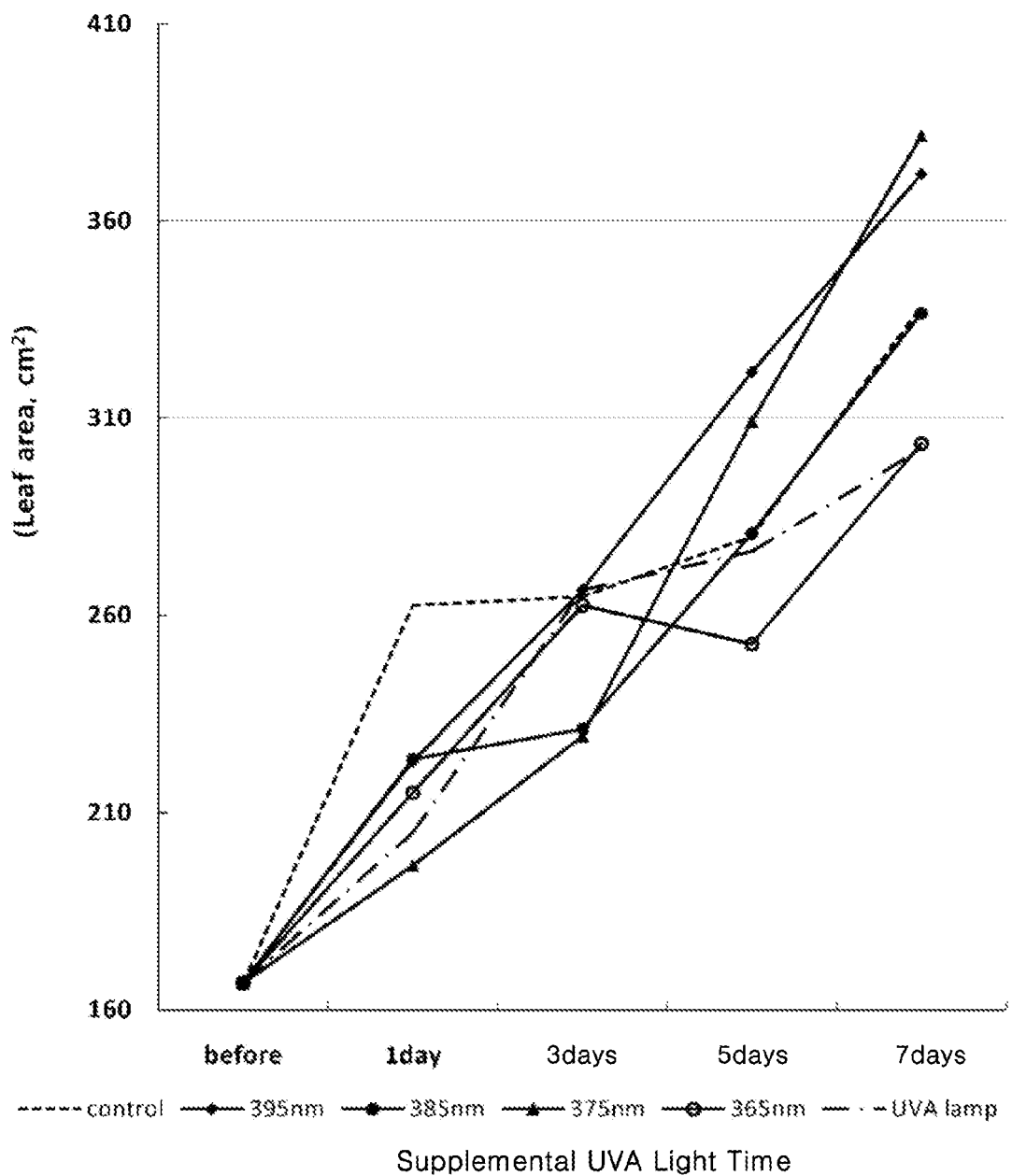
Figure 22:
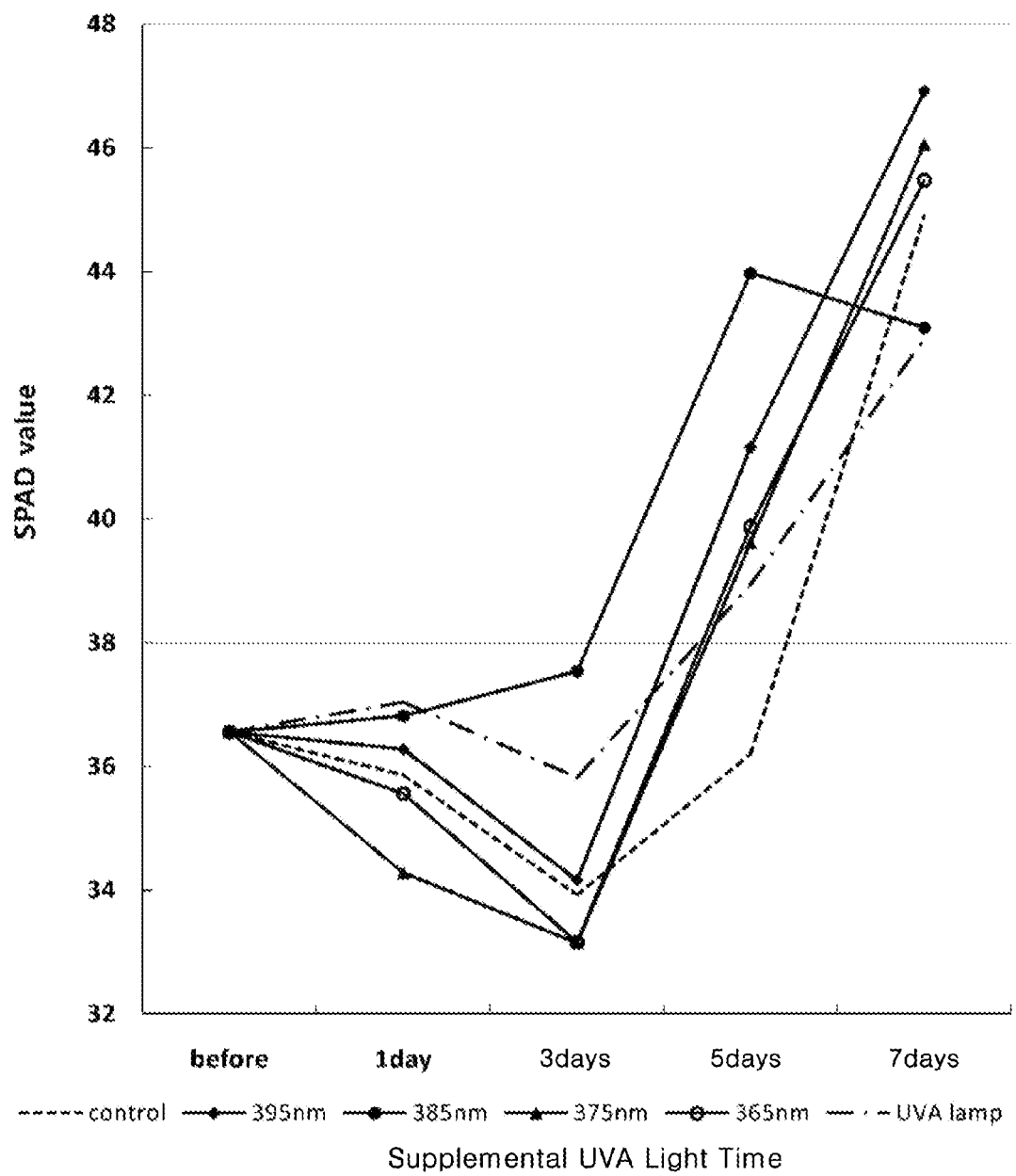

FIG. 19 to FIG. 22 are graphs related to growth of an ice plant. Specifically, FIG. 19 shows the fresh weight of ice plant samples. FIG. 20 shows the dry weight of ice plant samples. FIG. 21 shows the leaf area of ice plant samples. FIG. 22 shows the SPAD value (chlorophyll content) of ice plant samples.

Referring to the fresh weight, dry weight, and leaf area values shown in the graphs, it can be seen that supplemental UVA lighting treatment for a certain period of time improves growth of the ice plant.

Ice plant samples on day 1 of supplemental UVA lighting treatment grew less than the control group. This is because the ice plant samples were stressed by UVA and suffered from poor growth. However, on day 5 and day 7 of supplemental UVA lighting treatment, growth of most ice plant samples treated with supplemental UVA lighting significantly increased as compared with that of the control group or was comparable to that of the control group. That is, it can be seen that supplemental UVA lighting treatment can cause poor growth of the ice plant in earlier days due to stress caused thereby. However, supplemental UVA lighting treatment can recover growth of the ice plant over time and eventually allows the ice plant to grow more than or similar to the control group.

Referring to Soil-Plant Analysis Development (SPAD) values shown in the graph, ice plant samples on day 5 of supplemental UVA lighting treatment had larger SPAD values than the control group. That is, it can be seen that UVA irradiation improves growth of the ice plant. In particular, ice plant samples treated with the 395 nm LED and the 385 nm LED had larger SPAD values than those treated with the UVA lamp, the 365 nm LED, and the 375 nm LED.

Therefore, it can be seen that, when a plant is subjected to UVA irradiation for a certain period of time, growth of the plant is increased, as compared with when the plant is not subjected to UVA irradiation, or is at least comparable with that when the plant is not subjected to UVA irradiation.

Figure 23:
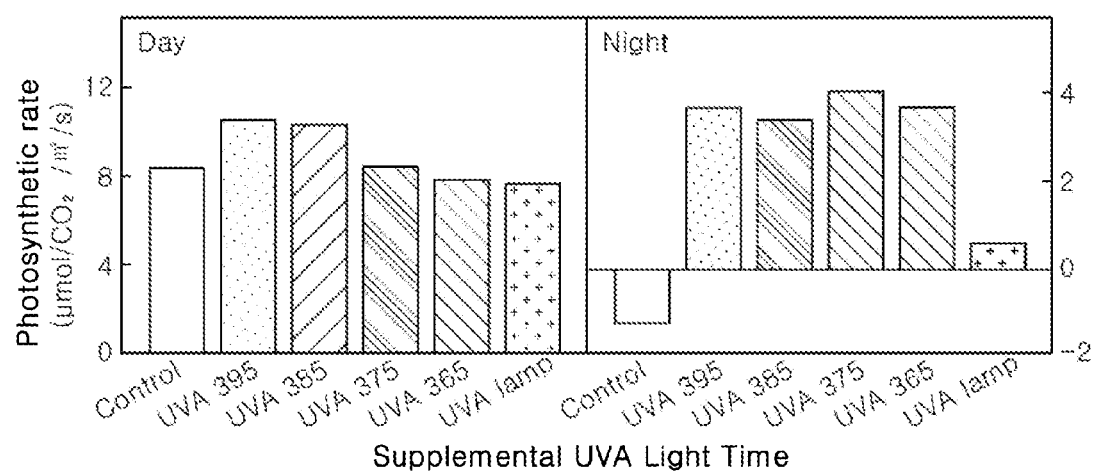
FIG. 23 is a graph showing the photosynthetic rate of an ice plant.

FIG. 23 is a graph showing the photosynthetic rate of an ice plant.

Specifically, FIG. 23 shows the photosynthetic rates of ice plant samples treated with supplemental UVA lighting for 3 days under daytime and nighttime conditions.

Here, the daytime condition means that ice plant samples are subjected to both mixed light irradiation and supplemental UVA lighting, and the nighttime condition means that ice plant samples are subjected to only supplemental UVA lighting without mixed light irradiation.

Ice plant samples treated with supplemental UVA lighting under the daytime condition had a photosynthetic rate larger than or similar to that of the control group. Ice plant samples treated with supplemental UVA lighting under the nighttime condition all had a larger photosynthetic rate than that of the control group. Thus, it can be seen that UVA irradiation alone without visible light irradiation is helpful in photosynthesis of plants. That is, it can be seen that UVA irradiation is helpful in growth of plants. In addition, it can be seen that a UVA LED is more helpful in growth of plants than a UVA lamp.

Figure 24:
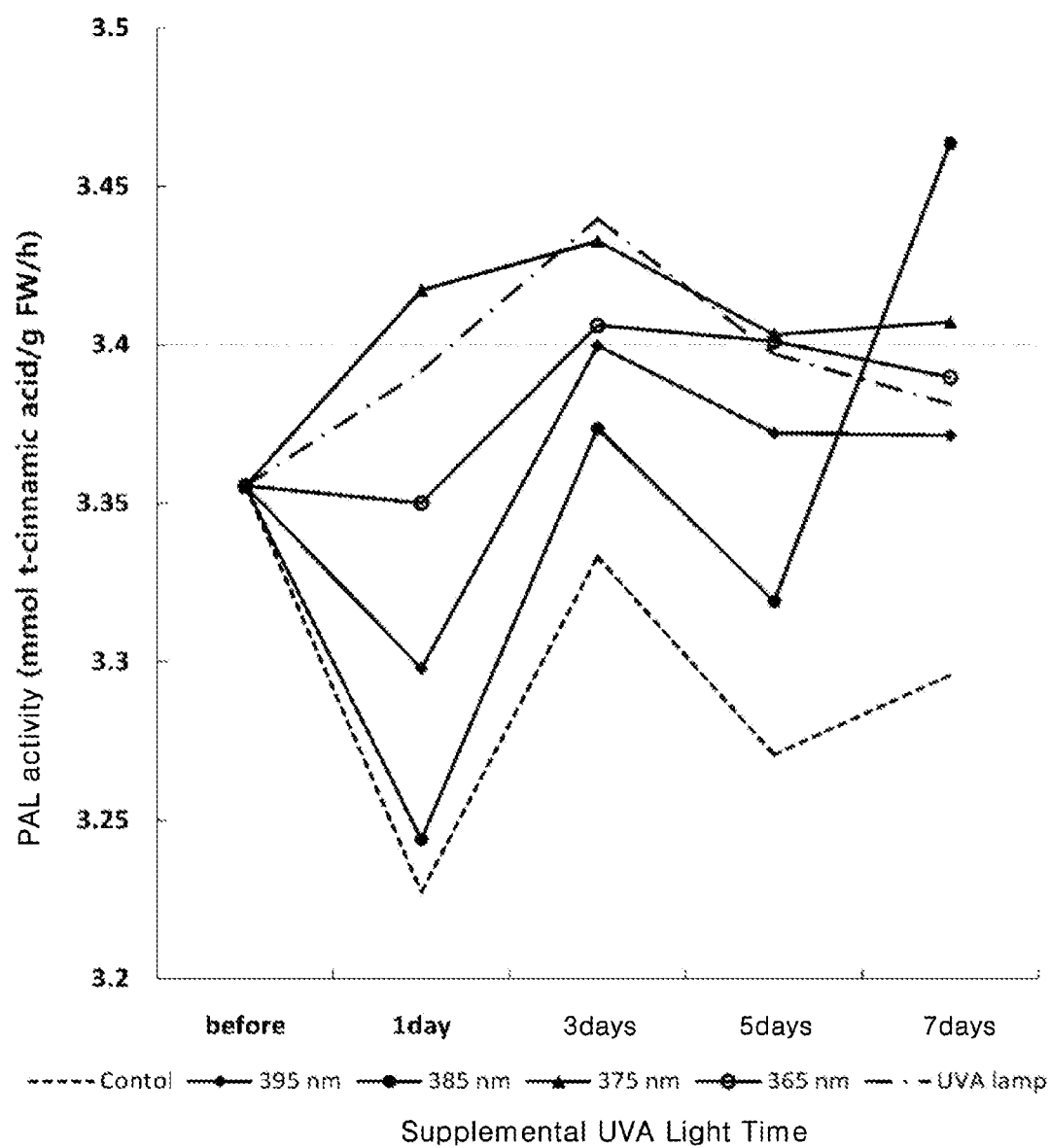
FIG. 24 is a graph showing the PAL activity of an ice plant.

FIG. 24 is a graph showing the PAL activity of an ice plant. PAL is an enzyme that determines whether a photosynthetic anabolic product will be a primary metabolite associated with growth of plants or a secondary metabolite associated with defensive substances such as phytochemicals. That is, increase in PAL activity can mean increase in secondary metabolites.

Referring to FIG. 24, ice plant samples treated with supplemental UVA lighting all had a higher Physical Activity Level (PAL) activity than the control group. That is, it can be seen that UVA irradiation increases production of secondary metabolites in a plant, resulting in increase in content of phytochemicals.

Figure 25:
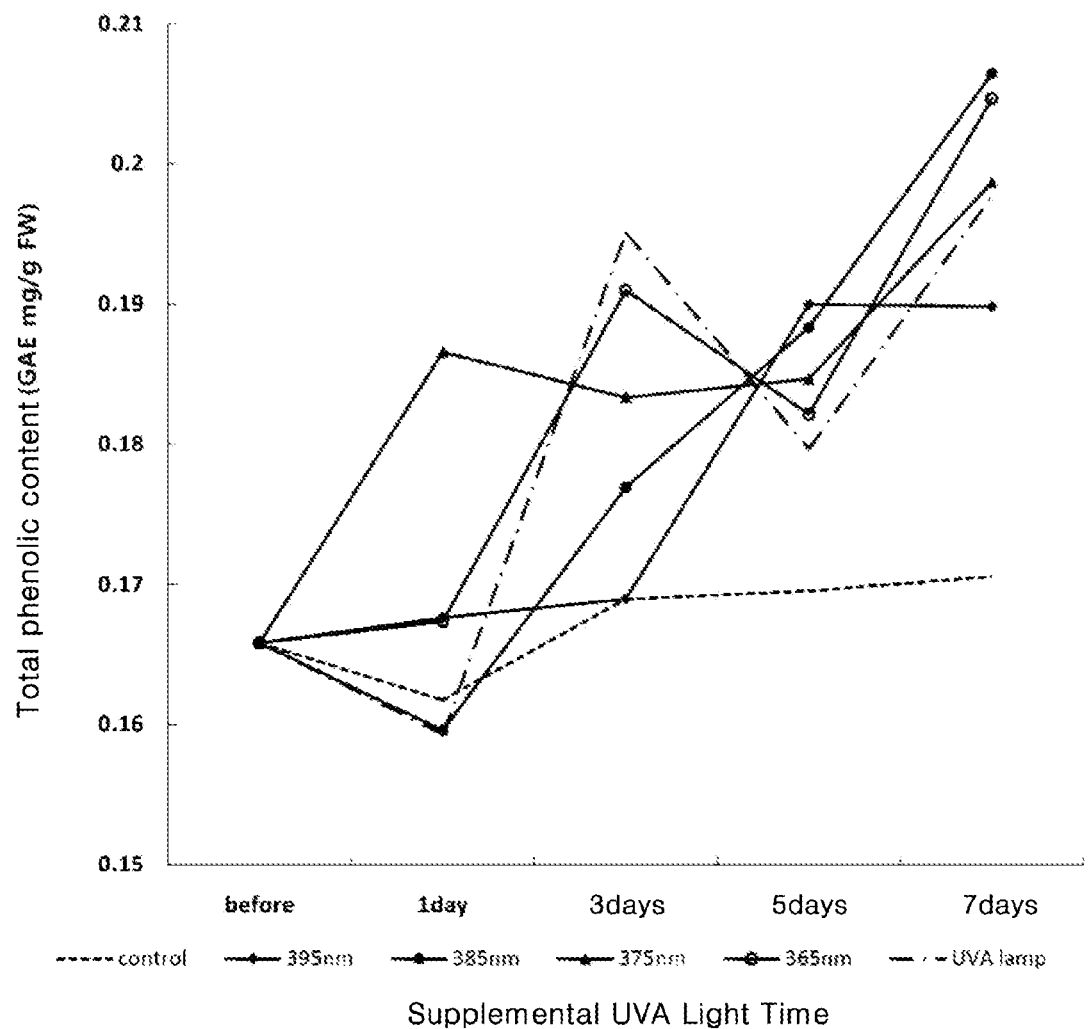
FIG. 25 and FIG. 26 are graphs showing the content of phytochemicals in an ice plant, where.
Figure 26:
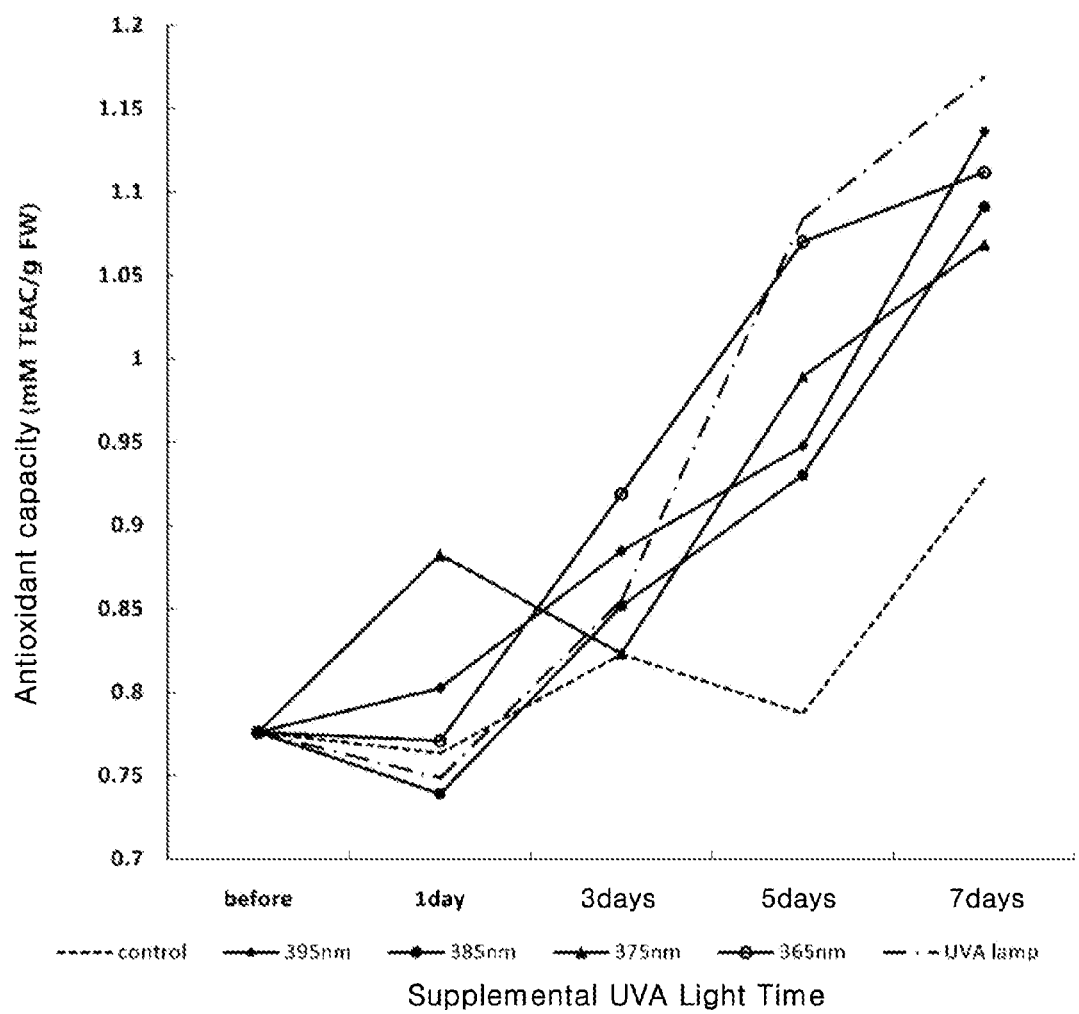

FIG. 25 and FIG. 26 are graphs showing the content of phytochemicals in an ice plant.

Specifically, FIG. 25 shows the total phenolic content of ice plant samples, and FIG. 26 shows the antioxidant capacity of the ice plant samples.

It can be seen that the total phenolic content and antioxidant capacity of ice plant samples treated with supplemental UVA lighting for a certain period of time were higher than those of the control group. In particular, since day 5 of supplemental UVA lighting treatment, the total phenolic content and antioxidant capacity of the ice plant samples treated with supplemental UVA lighting were significantly higher than those of the control group.

From the results of the experiment using the ice plant samples, it can be seen that growth of the ice plant samples follows a similar pattern to the phytochemical content of the ice plant.

Therefore, it can be seen that UVA irradiation for a certain period improves both the growth and the phytochemical content of plants.

In addition, by comparing a UV LED and a UV lamp as a light source, it can be seen that use of a UVA-LED as a light source for UV irradiation achieved better results over almost the entire period of UV irradiation in terms of increase in growth and phytochemical content of plants than use of a UVA lamp as the light source. The UVA lamp emits radiation in the entire UVA region. Specific functions, such as increasing the photosynthetic rate and phytochemical content of plants require UVA having a specific wavelength. Accordingly, use of an LED emitting UVA having a specific wavelength as the light source for supplemental UVA lighting is more advantageous in improving specific functions of plants than use of the UVA lamp.

Kale Cultivation 2

Seeds of kale were sown in a seed growing pack and then grown to seedlings for 2 weeks. Then, the kale seedlings were cultivated for 3 weeks under a low-light intensity condition (PPFD of 125 μmol/m$^2$/s) and under a high-light intensity condition (PPFD of 250 μmol/m$^2$/s). Leaves of kale cultivated under the high-light intensity condition were thicker than those of kale cultivated under the low-light intensity condition.

These two types of kale samples having different leaf thicknesses were treated with supplemental UVA lighting for one week using a UVA-LED.

FIG. 27 to FIG. 30 are graphs showing growth of the kale samples.

Figure 27:
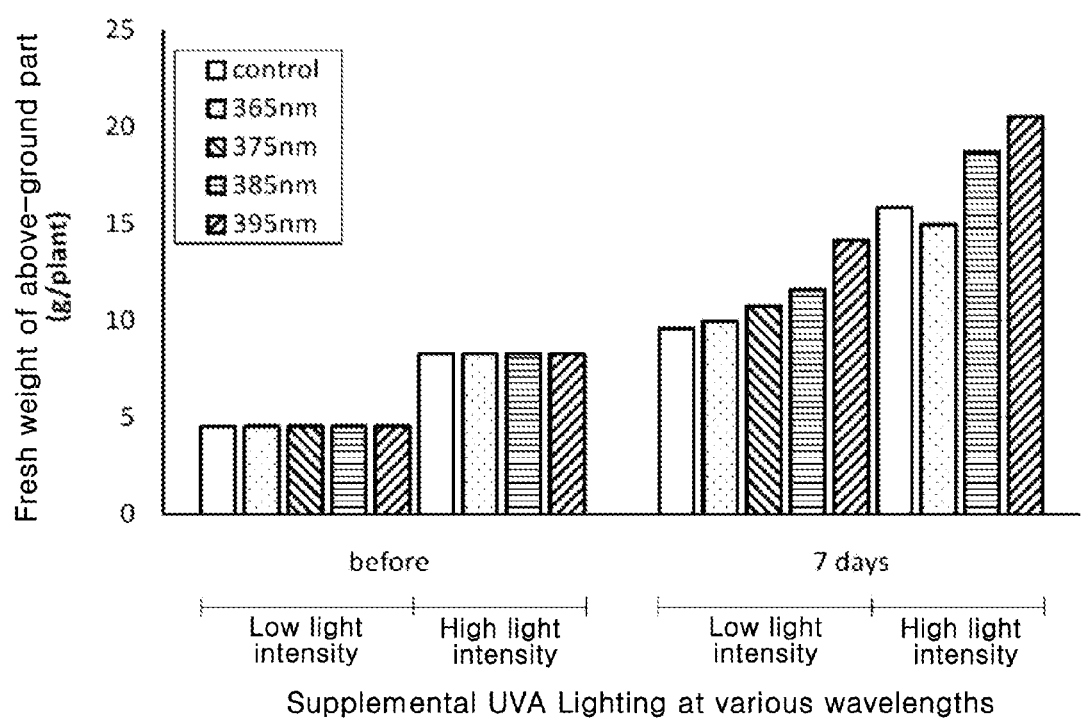
FIG. 27 to FIG. 30 are graphs showing growth of kale, where.
Figure 28:
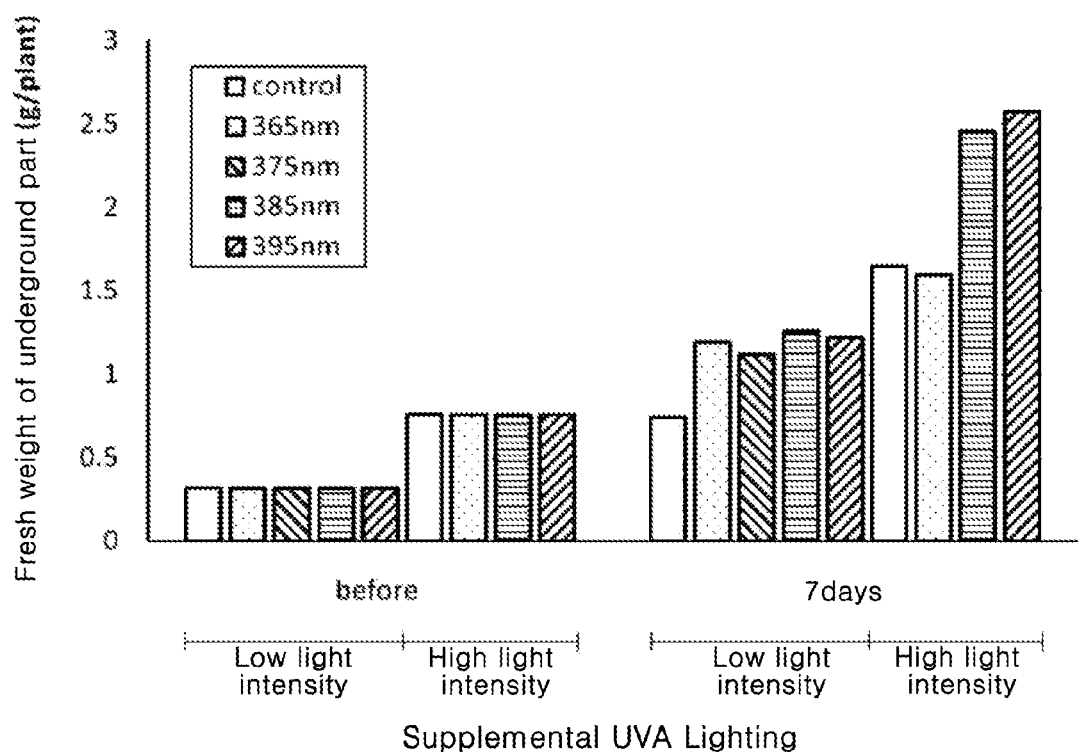
Figure 29:
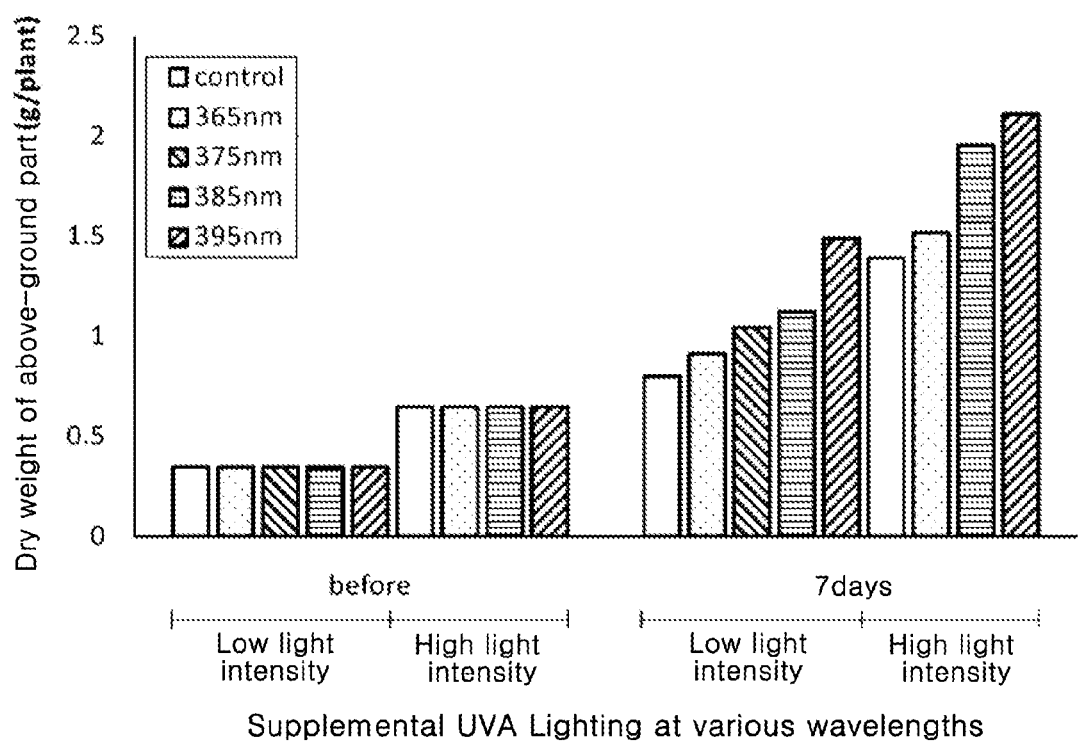
Figure 30:
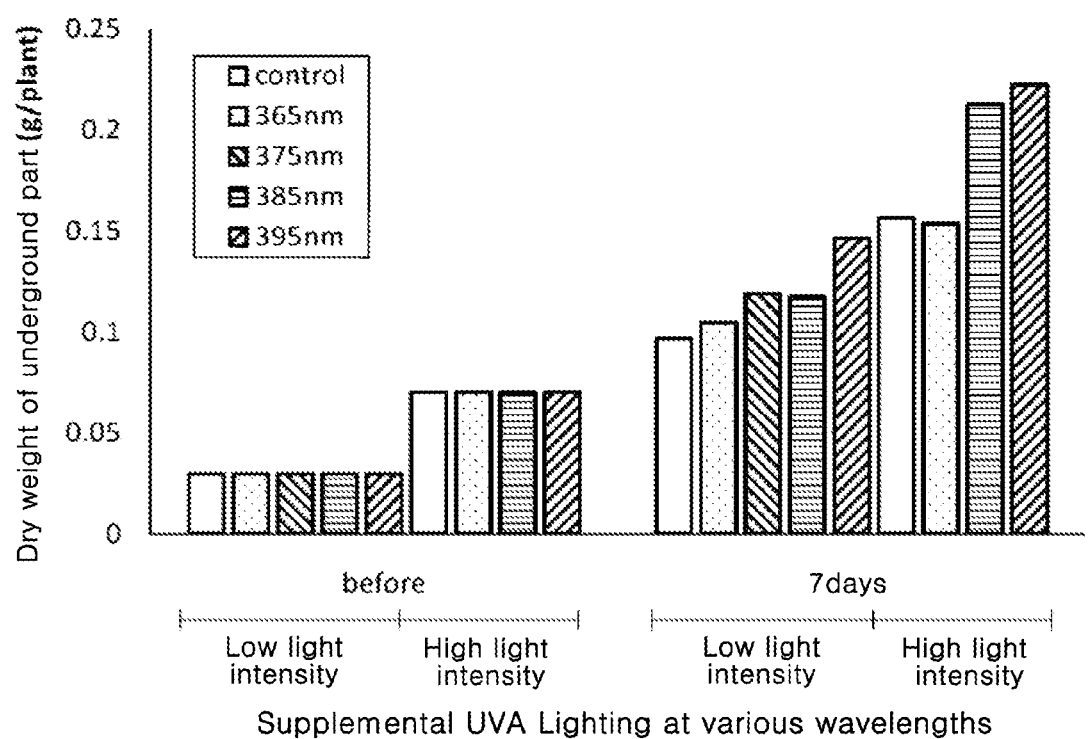

FIG. 27 shows the fresh weight of the above-ground part of the two types of kale samples treated with supplemental UVA lighting at various wavelengths, and FIG. 28 shows the fresh weight of the underground part of the two types of kale samples treated with supplemental UVA lighting at various wavelengths. FIG. 29 shows the dry weight of the above-ground part of the two types of kale samples treated with supplemental UVA lighting at various wavelengths, and FIG. 30 shows the dry weight of the underground part of the two types of kale samples treated with supplemental UVA lighting at various wavelengths.

FIG. 27 to FIG. 30 show results of comparing growth of the two types of kale samples subjected to UVA irradiation at various wavelengths for 7 days with growth of the control group not subjected to UVA irradiation.

From the results of comparison, it can be seen that, 7 days after UVA irradiation, most of the two types of kale samples cultivated under the low-light and high-light intensity conditions had a greater fresh weight and dry weight than the control group. In particular, UVA having a longer wavelength caused a more significant difference between the kale samples and the control group in terms of fresh weight and dry weight.

Figure 31:
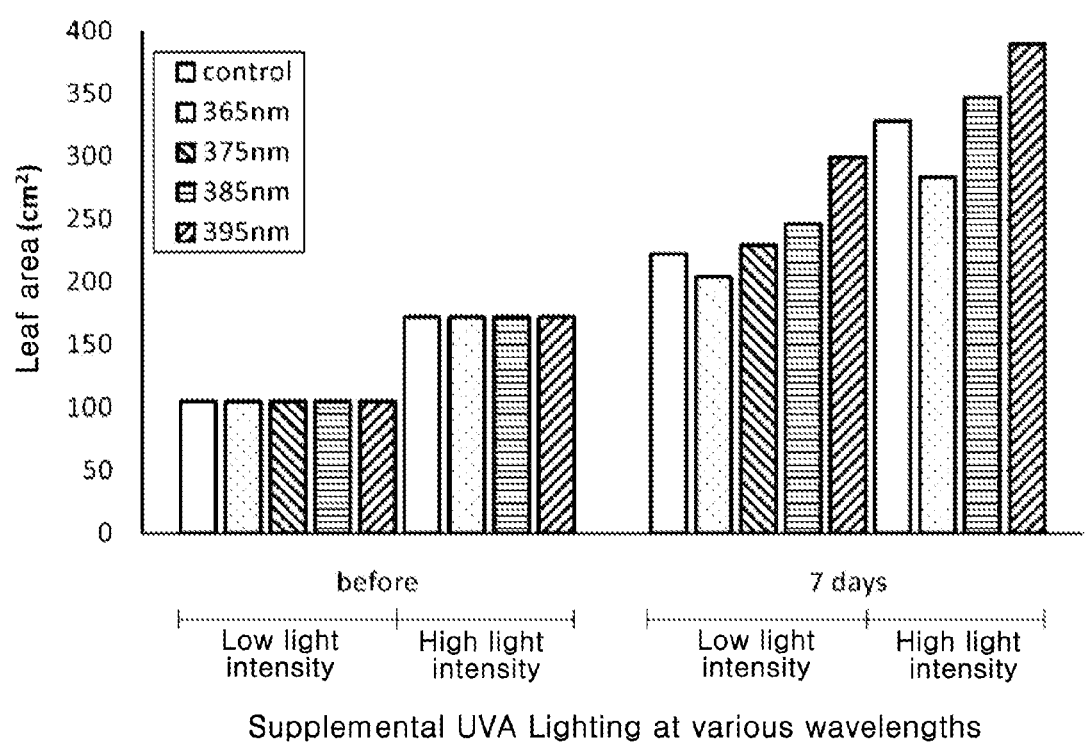
FIG. 31 is a graph showing the leaf area of kale.
Figure 32:
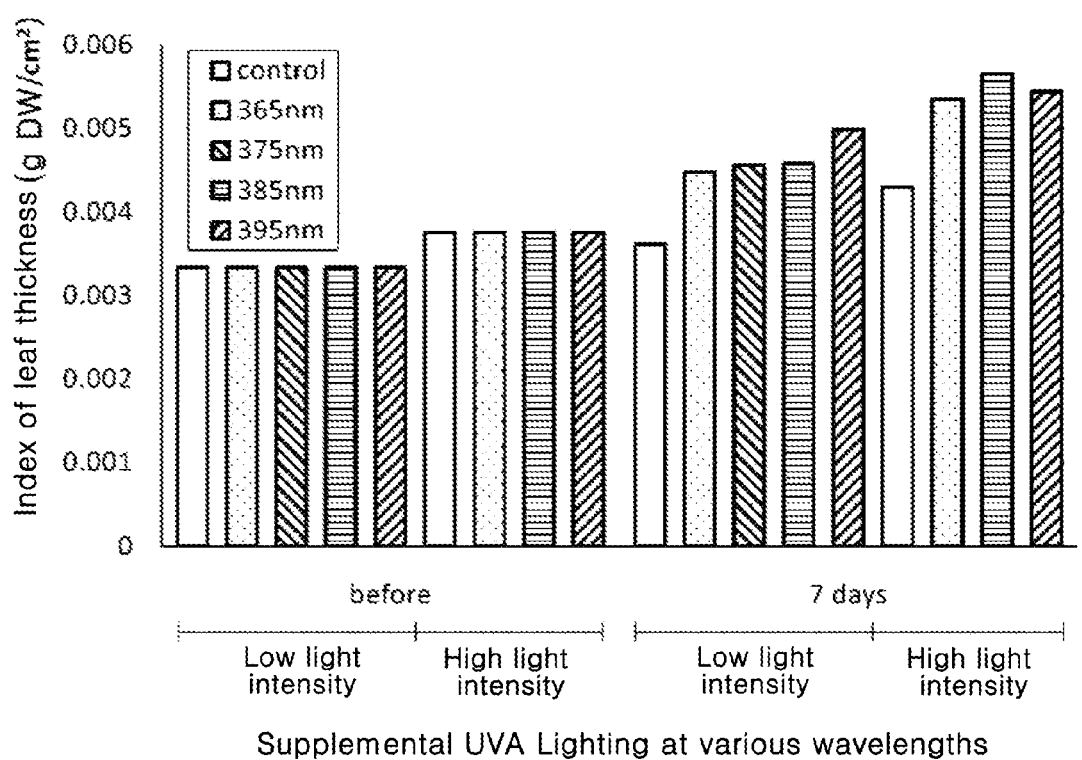
FIG. 32 is a graph showing the index of leaf thickness of kale.

FIG. 31 is a graph showing the leaf area of kale. FIG. 32 is a graph showing the index of leaf thickness of kale.

FIG. 31 and FIG. 32 show changes in leaf area and leaf thickness of two types of kale samples cultivated under low-light and high-light intensity conditions after supplemental UVA lighting treatment for 7 days. Here, the index of leaf thickness is a value obtained by dividing the dry weight of a leaf by the area of the leaf. Accordingly, a larger index of leaf thickness indicates a larger leaf thickness.

The leaf area and index of leaf thickness of the two types of kale samples treated with supplemental UVA lighting for 7 days were generally larger than those of the control group. In particular, UVA having a longer wavelength caused a more significant difference between the kale samples and the control group in terms of leaf area and index of leaf thickness.

From the results shown in FIG. 27 to FIG. 32, it can be seen that UVA irradiation, particularly, UVA irradiation at a longer wavelength, is helpful in improving growth of plants.

Figure 33:
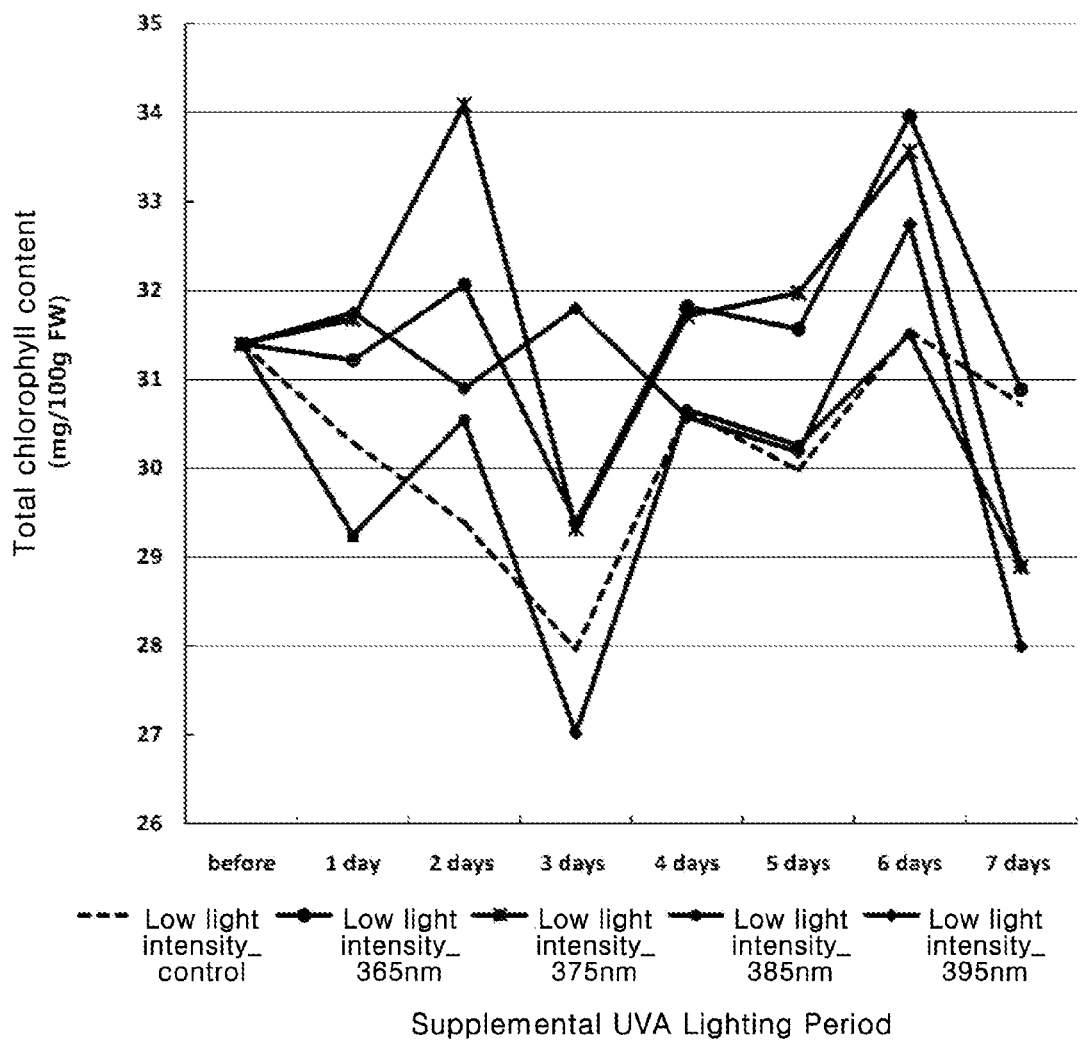
FIG. 33 and FIG. 34 are graphs showing the total chlorophyll content of kale, where.
Figure 34:
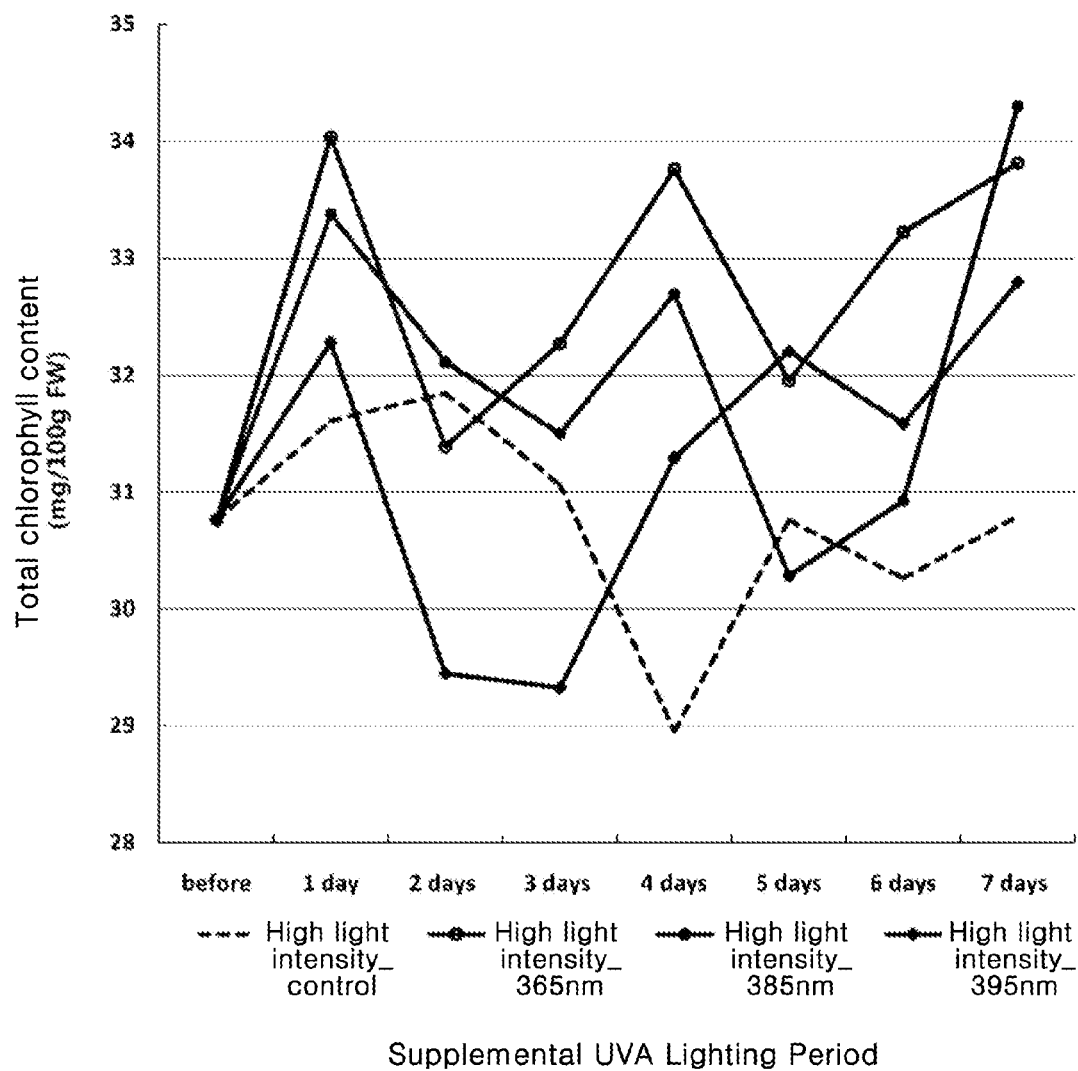

FIG. 33 and FIG. 34 are graphs showing the total chlorophyll content of kale.

FIG. 33 shows the total chlorophyll content of kale samples cultivated under the low-light intensity condition. FIG. 34 shows the total chlorophyll content of kale grown under the high-light intensity condition.

Referring to FIG. 33, the kale samples cultivated under the low-light intensity condition generally had a higher total chlorophyll content than the control group on days 2 to 6 of supplemental UVA lighting treatment. In order to help understand the graph, FIG. 33 does not show a margin of error for the total chlorophyll content of the control group and kale samples treated with supplemental UVA lighting at respective wavelengths. Considering the margin of error not shown, the kale samples cultivated under the low-light intensity condition had a significantly higher total chlorophyll content than the control group when treated with UVA having a wavelength of 395 nm for 3 days.

Referring to FIG. 34, the kale samples cultivated under the high-light intensity condition generally had a higher total chlorophyll content than the control group on days 4 to 7 of supplemental UVA lighting treatment. Considering a margin of error for the total chlorophyll content not shown in the graph, the kale samples cultivated under the high-light intensity condition had a significantly higher total chlorophyll content than the control group when treated with UVA having a wavelength of 365 nm for 4 days.

From these experimental results, it was confirmed that supplemental UVA lighting for a certain period of time causes a plant to be more likely to perform photosynthesis. Therefore, it can be seen that supplemental UVA lighting can cause a plant to produce more photosynthetic products which are helpful for growth thereof.

FIG. 35 to FIG. 38 are graphs showing the phytochemical content of kale.

Figure 35:
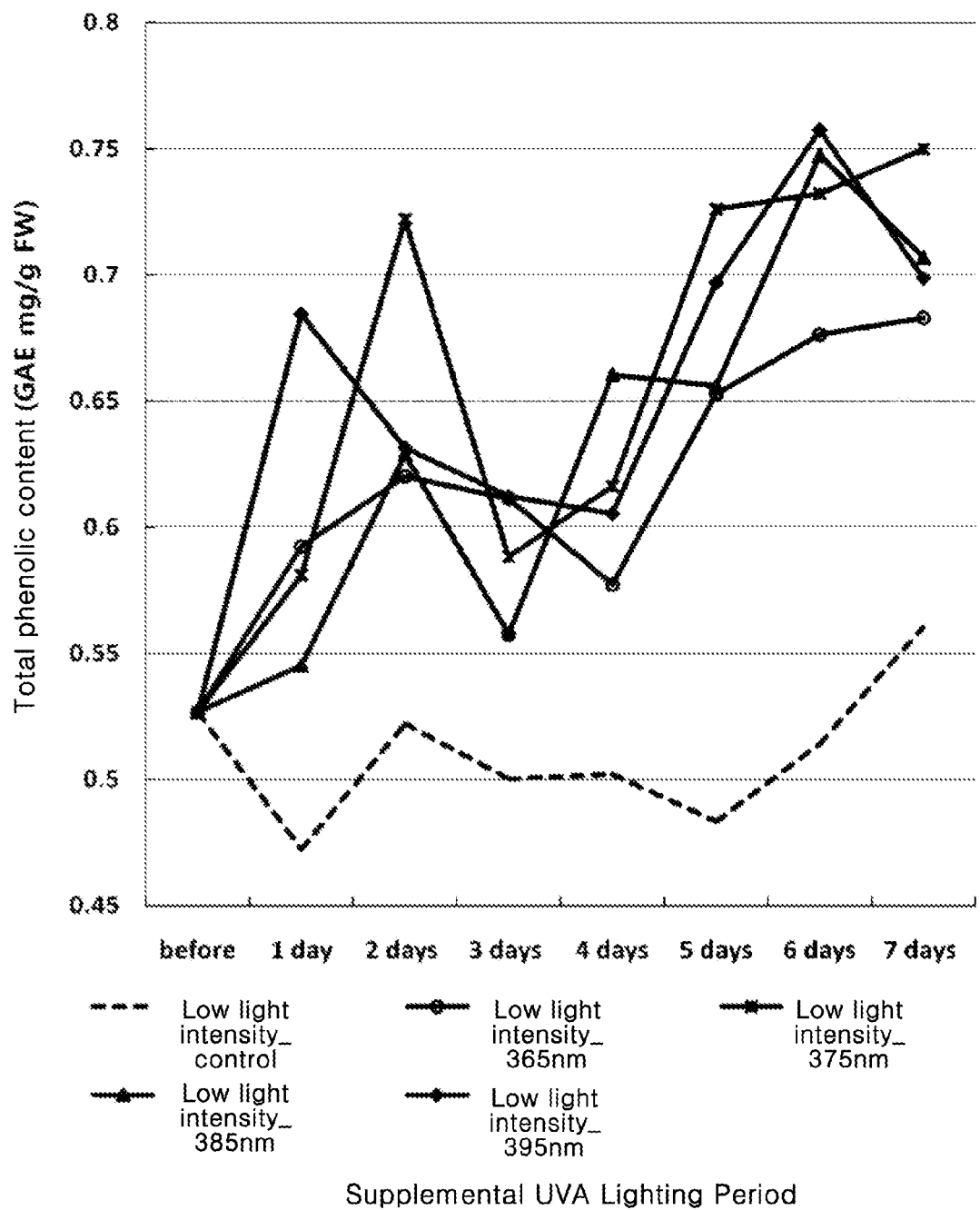
FIG. 35 to FIG. 38 are graphs showing the content of phytochemicals in kale, where.
Figure 36:
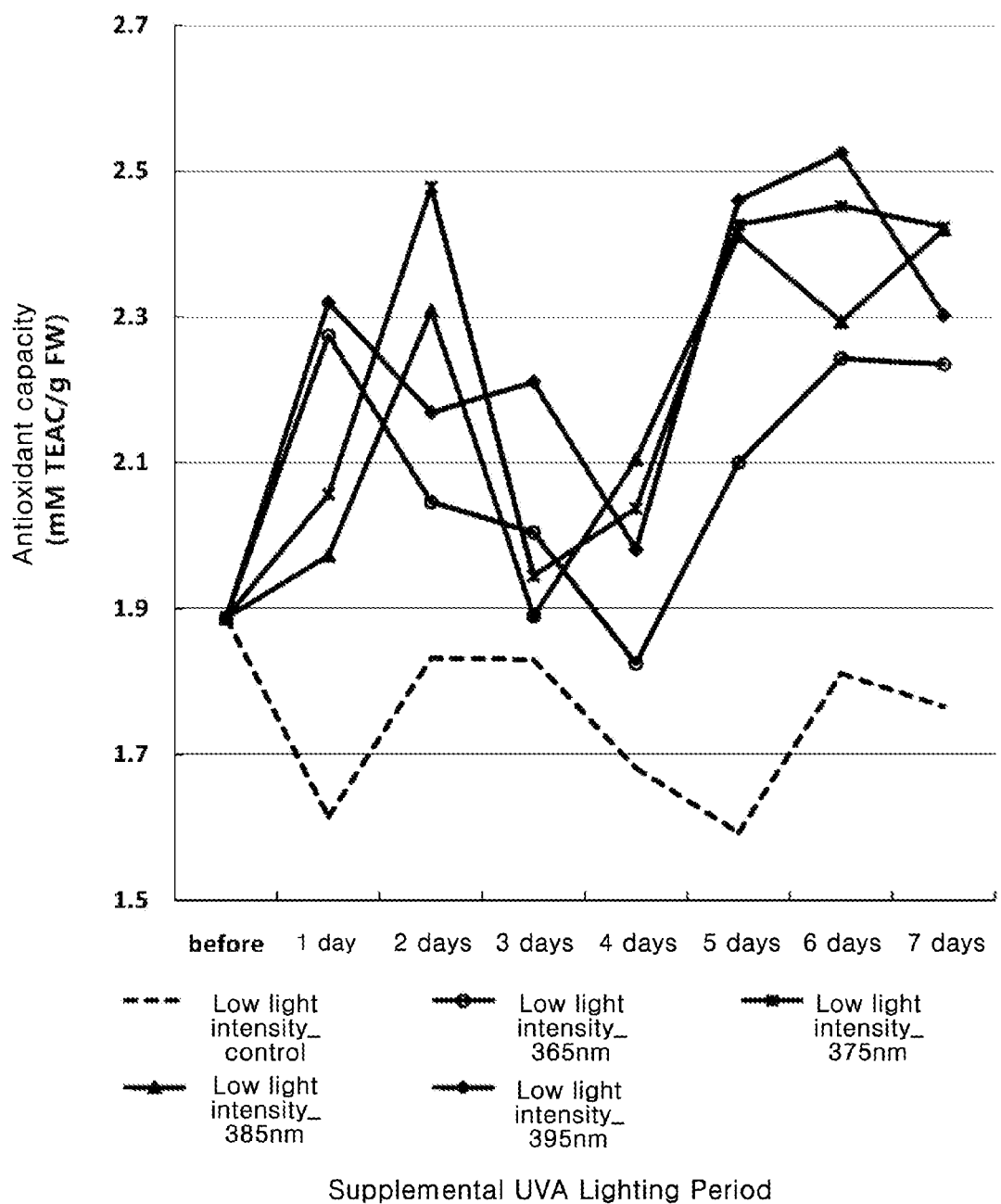
Figure 37:
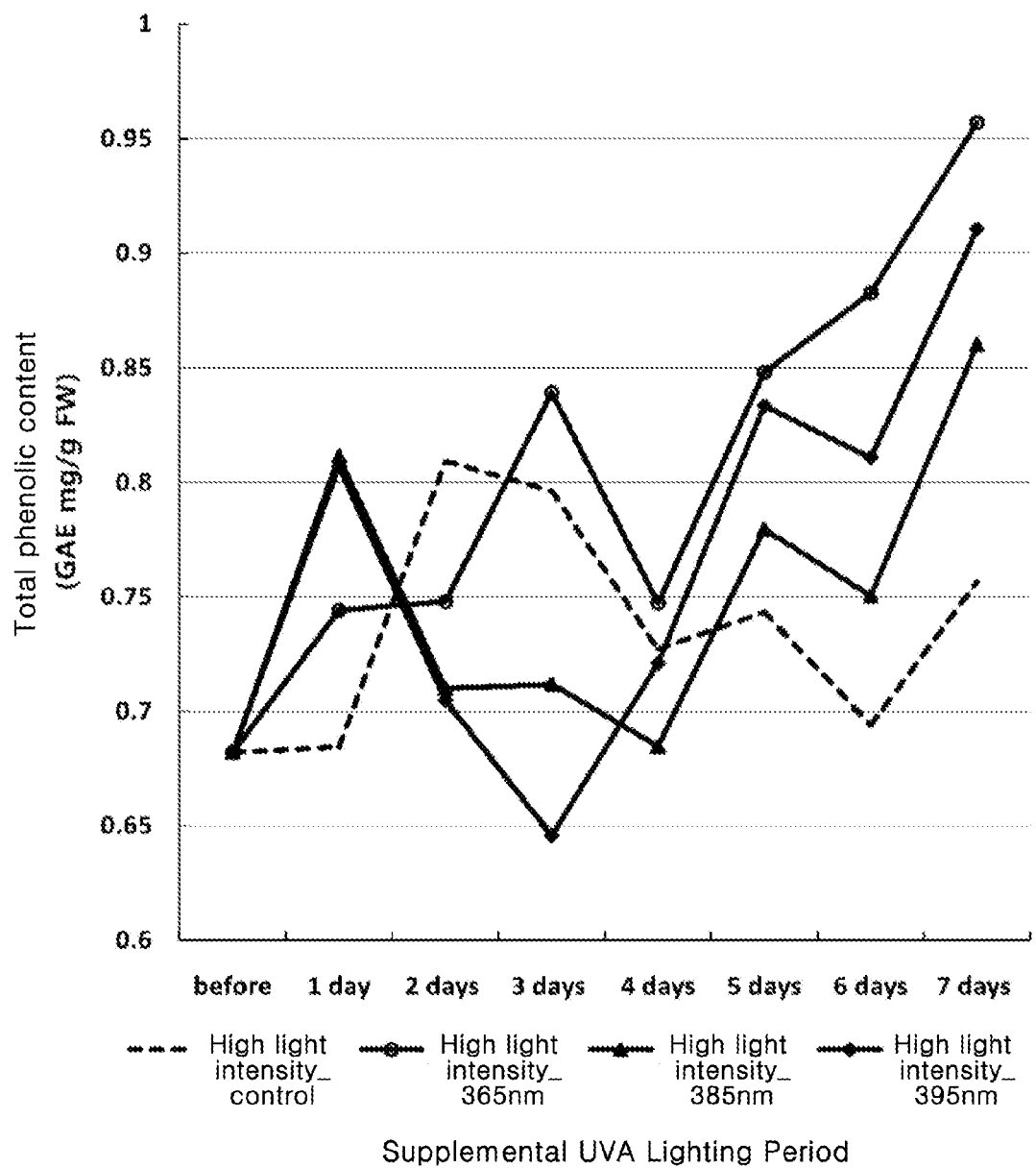

FIG. 35 shows the total phenolic content of kale samples cultivated under the low-light intensity condition, and FIG. 36 shows the antioxidant capacity of kale samples cultivated under the low-light intensity condition. FIG. 37 shows the total phenolic content of kale samples cultivated under the high-light intensity condition, and FIG. 38 shows the antioxidant capacity of kale samples cultivated under the high-light intensity condition.

Referring to FIG. 35 and FIG. 36, the kale samples cultivated under the low light intensity condition all had a higher total phenolic content and antioxidant capacity than the control group when treated with supplemental UVA lighting. In particular, among the kale samples cultivated under the low light intensity condition, kale samples on days 5 and 6 of UVA irradiation at a longer wavelength of 375 nm, 385 nm, or 395 nm had a significantly higher phytochemical content (total phenolic content and antioxidant capacity) than the other kale samples.

Figure 38:
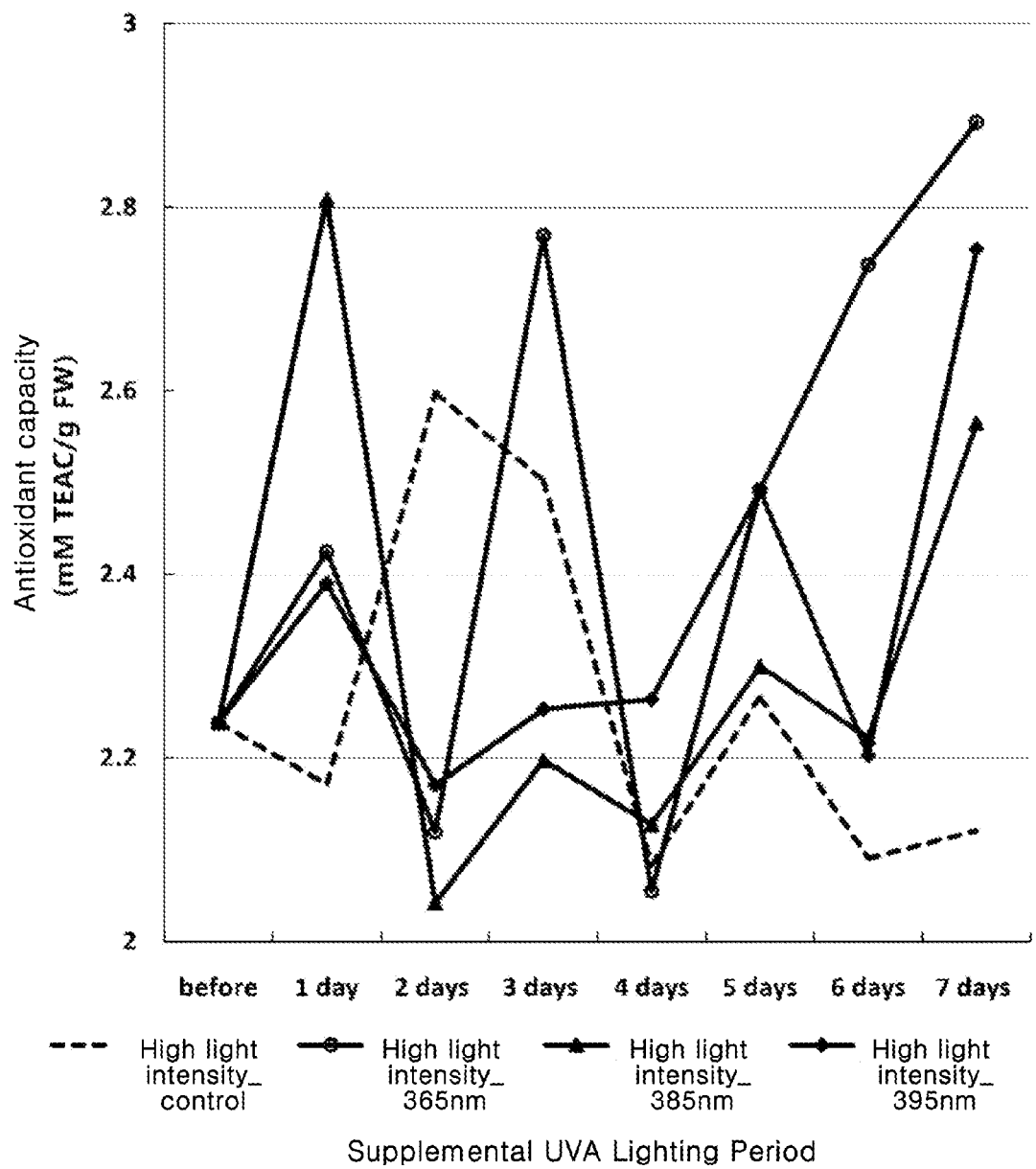

Referring to FIGS. 37 and 38, the kale samples cultivated under the high-light intensity condition had a higher total phenolic content and antioxidant capacity than the control group since day 5 of supplemental UVA lighting treatment. In particular, among the kale samples cultivated under the high-light intensity condition, kale samples on days 6 and 7 of UVA having a shorter wavelength of 365 nm had a significantly higher phytochemical content than the other kale samples.

That is, it can be seen that longer-wavelength UVA, which has less energy, is suitable for increasing the phytochemical content of thin-leaf plants and shorter-wavelength UVA, which has more energy, is suitable for increasing the phytochemical content of thick-leaf plants. This is because shorter-wavelength UVA causes excessive stress to thin-leaf plants and thus fails to induce increase in phytochemical content of the plants. In addition, it can be seen that more energy than needed to increase the phytochemical content of thin-leaf plants is needed in order to increase the phytochemical content of thick-leaf plants.

Figure 39:
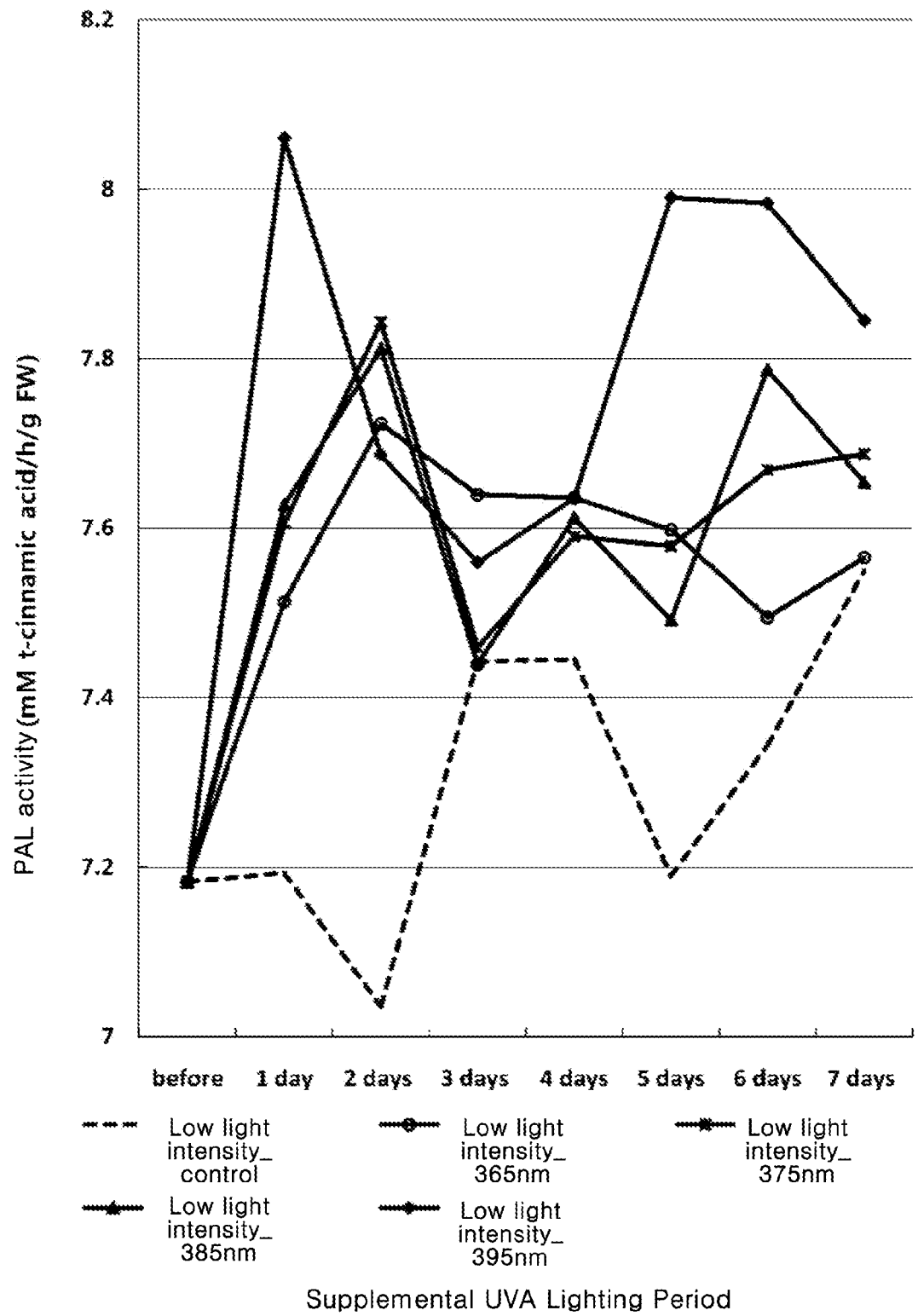
FIG. 39 and FIG. 40 are graphs showing the PAL activity of kale, where.
Figure 40:
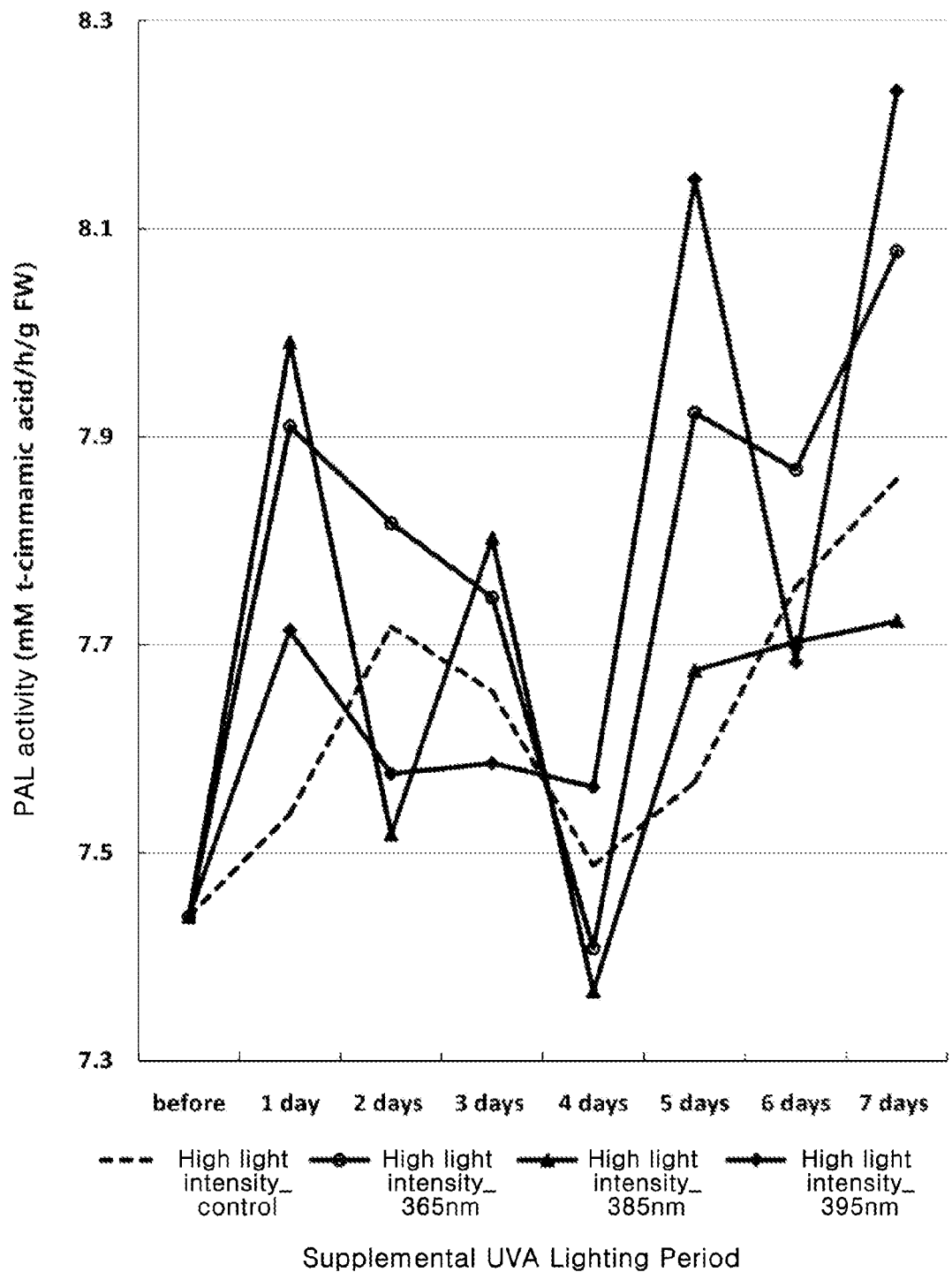

FIG. 39 and FIG. 40 are graphs showing the PAL activity of kale.

FIG. 39 shows the PAL activity of kale samples cultivated at the low-light intensity condition, and FIG. 40 shows the PAL activity of kale samples cultivated at the high-light intensity condition.

Referring to FIG. 39, the kale samples cultivated under the low-light intensity condition had higher PAL activity than the control group since day 4 of UVA irradiation. In particular, among the kale samples cultivated under the low-light intensity condition, kale samples on days 5 and 6 of supplemental UVA lighting treatment at a wavelength of 395 nm had significantly high PAL activity. That is, it can be seen that UVA irradiation at a low energy wavelength can increase production of secondary metabolites in a thin-leaf plant, which is effective in increasing the phytochemical content of the plant.

Referring to FIG. 40, the kale samples cultivated under the high-light intensity condition had higher PAL activity than the control group on days 6 and 7 of UVA irradiation at a wavelength of 365 nm. That is, it can be seen that UVA irradiation at a high energy wavelength can increase production of secondary metabolites in a thick-leaf plant, which is effective in increasing the phytochemical content of the plant.

Through the experiments using the ice plant and kale, it can be seen that UVA can improve the growth and phytochemical content of plants. In addition, UVA irradiation at a specific wavelength helps improve specific functions, such as increasing the phytochemical content of plants. Therefore, treating plants with supplemental UVA lighting using an LED emitting UV radiation at a specific wavelength can improve specific functions of the plants.

Figure 41:
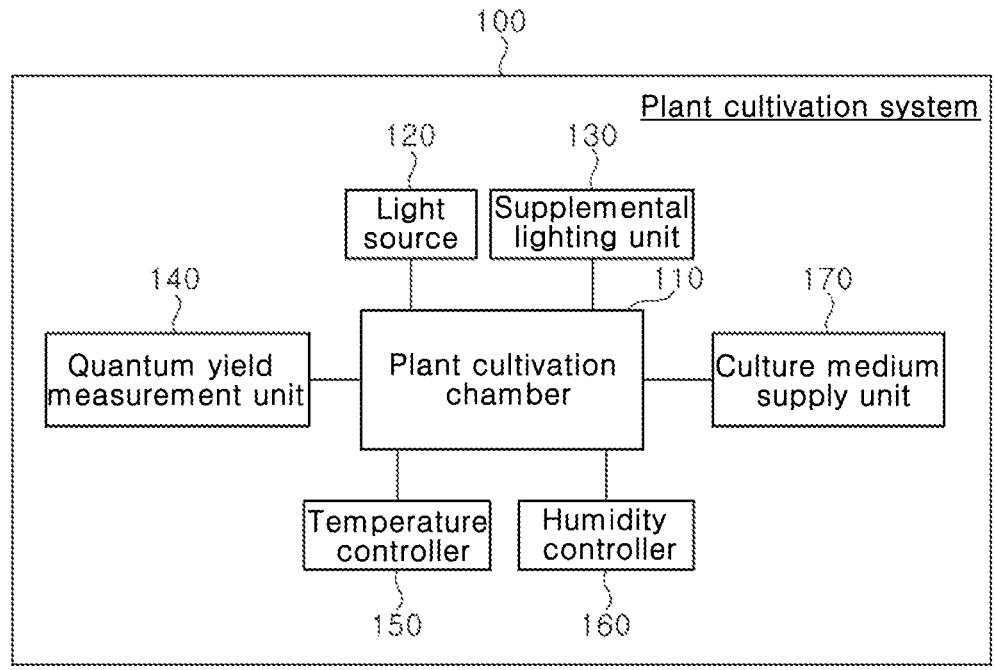
FIG. 41 is a schematic diagram of a plant cultivation system according to one embodiment of the present disclosure.

FIG. 41 is a schematic diagram of a plant cultivation system 100 according to one embodiment of the present disclosure. Referring to FIG. 41, the plant cultivation system 100 according to this embodiment includes a plant cultivation chamber 110, a light source 120, a supplemental lighting unit 130, a quantum yield measurement unit 140, a temperature controller 150, a humidity controller 160, and a culture medium supply unit 170. The plant cultivation chamber 110 provides a space for growth of a plant.

The light source 120 illuminates the plant with light for growth of the plant. The light emitted from the light source 120 includes at least one of visible light and white light. For example, the light emitted from the light source 120 may be mixed light obtained by mixing white light with red light in a predetermined ratio. For example, the light source 120 may illuminate the plant at intervals of 12 hours. That is, the light source 120 may be turned on and off alternately at intervals of 12 hours. However, the illumination cycle of the light source 120 is not limited to 12 hours, and may vary depending on the types of plants cultivated. For example, the illumination cycle of the light source 120 may be more than 12 hours. Alternatively, the light source 120 may illuminate the plant without interruption.

The supplemental lighting unit 130 illuminates the plant with UVA. UVA emitted from the supplemental lighting unit 130 stresses the plant, thus allowing the plant to produce more phytochemicals. In addition, UVA from the supplemental lighting unit 130 may help growth of the plant. The supplemental lighting unit 130 may be a light source including a UVA-LED.

The quantum yield measurement unit 140 measures the quantum yield of the plant. Based on values of the quantum yield of the plant measured by the quantum yield measurement unit 140, it is possible to determine the phytochemical content of the plant or increase in phytochemical content of the plant.

The temperature controller 150 controls the temperature of the plant cultivation chamber 110. The temperature controller 150 allows the plant cultivation chamber 110 to be maintained at an appropriate temperature for growth of the plant.

The humidity controller 160 controls the humidity of the plant cultivation chamber 110. The humidity controller 160 allows the plant cultivation chamber 110 to be maintained at an appropriate humidity for growth of the plant.

The culture medium supply unit 170 supplies a culture medium to the plant. The culture medium supply unit 170 may store the culture solution to provide the culture solution to the plant as needed.

Each component of the plant cultivation system 100 may be automatically operated according to pre-configured setting(s). Alternatively, each component of the plant cultivation system 100 may be manually operated, as needed by a user.

In addition, the plant cultivation system 100 may apply additional stress treatment to the plant using the light source 120, the supplemental lighting unit 130, the temperature controller 150, the humidity controller 160, the culture medium supply unit 170, or a combination thereof.

Although not shown, the plant cultivation system 100 may further include a separate component adapted to control salt, ozone, and the like to apply additional stress treatment to the plant.

The plant cultivation system 100 may further include a component controlling the concentration of carbon dioxide in the plant cultivation chamber 110 and a component controlling the intensity of air flow in the plant cultivation chamber 110. In addition, the plant cultivation system 100 may further include: a sensor measuring an environment in the plant cultivation chamber 110; and a database and a controller which are adapted to control the operation of each component of the plant cultivation system 100 based on measured values from the sensor.

These components of the plant cultivation system 100 not shown in FIG. 41 may be added as needed by those skilled in the art. In addition, some components of the plant cultivation system 100 shown in FIG. 41 may be omitted as needed by those skilled in the art.

The plant cultivation system 100 according to this embodiment can increase the phytochemical content of the plant by treating the plant with supplemental UVA lighting using the supplemental lighting unit 130. In addition, the plant cultivation system 100 allows a user to estimate the phytochemical content of the plant using the quantum yield measurement unit 140 and to determine when to harvest the plant based on the estimates. Measurement of the quantum yield of the plant by the quantum yield measurement unit 140 may be conducted manually or automatically, as needed by a user.

Figure 42:
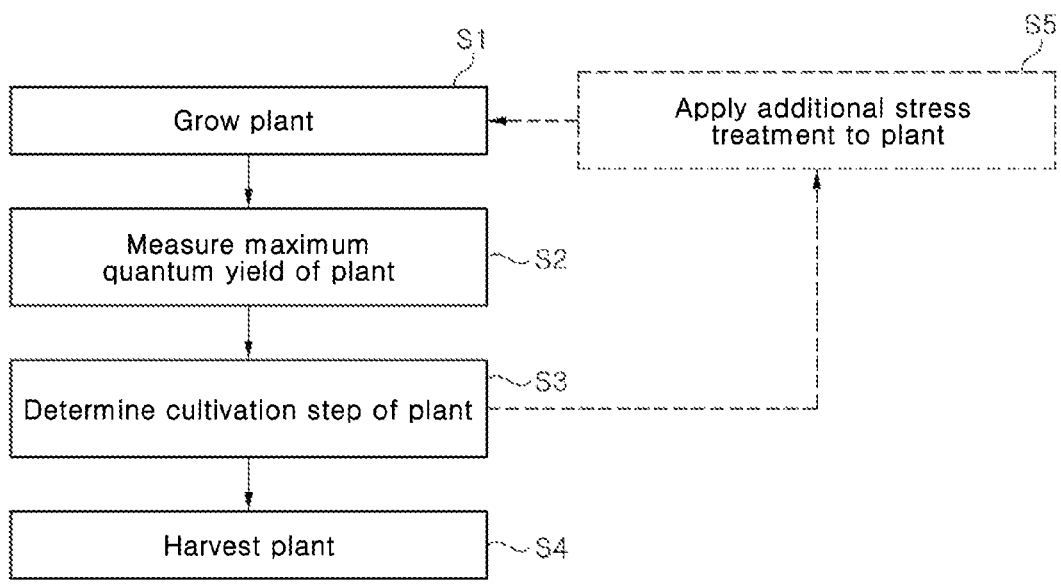
FIG. 42 is a flowchart of a plant cultivation method according to one embodiment of the present disclosure.

FIG. 42 is a flowchart of a plant cultivation method according to one embodiment of the present disclosure.

In step S1, a plant is grown. Here, the plant is grown under supplemental UVA lighting treatment. Reference to the method of growing kale and ice plants described above including supplemental UVA lighting treatment can be made. However, it will be understood that the present disclosure is not limited thereto and the method may be varied depending on the types of plants. Here, supplemental UVA lighting treatment can improve both the growth and the phytochemical content of the plant.

As a light source for supplemental UVA lighting treatment, an LED is used. The LED may emit UVA radiation at a specific wavelength. Thus, use of the LED as the light source facilitates supplemental UVA lighting at a specific wavelength depending on the types and conditions of plants.

In step S2, a maximum quantum yield of the plant is measured. Here, the maximum quantum yield of the plant may be measured using a chlorophyll fluorescence meter. Specifically, the chlorophyll fluorescence meter acquires a fluorescence image of the plant and measures the maximum quantum yield by analyzing the acquired fluorescence image.

In step S3, a cultivation stage of the plant is determined based on the measured maximum quantum yield. The measured maximum quantum yield is compared with a preset range. Here, the preset range refers to the range of maximum quantum yield values corresponding to above-average phytochemical content values of the plant. The preset range may be set through the experiments described above. Although the experiments were conducted using kale and ice plants herein, it will be understood that, for different plants, different preset ranges may be set through experiments using corresponding plants.

If the measured maximum quantum yield falls within the preset range, the content of a phytochemical in the plant can be determined to be above the average value thereof. In addition, through the experiments described above, it can be seen that supplemental UVA lighting treatment can improve growth of the plant.

In step S4, the plant, the measured quantum yield of which falls within the preset range, is harvested based on a determination that the plant has reached sufficient growth and has a sufficiently high phytochemical content. For example, the preset range may have a lower limit of 0.6 and an upper limit of 0.72. Specifically, the preset range may have a lower limit of 0.68 and an upper limit of 0.69.

If the quantum yield measured in step S3 is outside the preset range, the plant may be subjected to additional stress treatment (step S5). The additional stress treatment can increase the phytochemical content of the plant.

Here, the additional stress treatment may include altering the wavelength, intensity, or duration of UVA irradiation. Alternatively, the additional stress treatment may be stress treatment using at least one selected from among UV light, temperature (air temperature, root temperature), water (water deficiency, hypoxia), light (light quality, light intensity), salt, and ozone. Alternatively, the additional stress treatment may be stress treatment using a combination thereof.

Alternatively, the additional stress treatment may be omitted even when the quantum yield measured in step S3 is outside the preset range. That is, step S1, in which the plant is grown under supplemental UVA lighting treatment, may be sustained until the maximum quantum yield of the plant falls within the preset range.

According to the embodiments of the present disclosure, the phytochemical content of a plant can be determined by acquiring a chlorophyll fluorescence image of the plant, followed by analysis of the acquired fluorescence image. Thus, according to the present disclosure, the plant can be harvested at the right time considering the growth and phytochemical content of the plant.

Although some embodiments have been described herein, it should be understood that various modifications, changes, alterations, and equivalent embodiments can be made by those skilled in the art without departing from the spirit and scope of the present disclosure. Therefore, it should be understood that these embodiments are provided for illustration only and are not to be construed in any way as limiting the present disclosure. The scope of the present disclosure should be defined by the appended claims and equivalents thereto.

The invention claimed is:

1. A plant cultivation method using ultraviolet (UV) radiation, comprising:
    applying supplemental ultraviolet A(UVA) lighting treatment to a selected plant;
    measuring a maximum quantum yield of the selected plant; and
    determining a cultivation stage of the selected plant based on the measured maximum quantum yield, determining the cultivation stage further comprising:
        if the measured maximum quantum yield falls within a preset range, determining to harvest the selected plant, and,
        if the measured maximum quantum yield is outside the preset range, determining whether to sustain growth of the selected plant or applying additional stress treatment to the selected plant;
    wherein:
        a phytochemical content is dependent upon the maximum quantum yield of the selected plant;
        the preset range is a range of maximum quantum yield values that is predetermined to correspond to a phytochemical content range of the selected plant which is higher than an average value thereof for the selected plant; and
        the preset range includes 0.6 to 0.72 for kale plants;
    wherein the step of applying additional stress treatment comprises:
        applying stress treatment using UV light, and using temperature, water, salt, ozone, or a combination thereof; and
        altering a wavelength, intensity, and duration of UVA.

2. The plant cultivation method according to claim 1, further comprising: if the measured maximum quantum yield is outside the preset range, forgoing to apply additional stress treatment to the selected plant and determining to sustain the growth of the selected plant until the maximum quantum yield reaches the preset range.

3. The plant cultivation method according to claim 1, wherein measuring the maximum quantum yield of the selected plant further comprises:
    acquiring a chlorophyll fluorescence image of the selected plant;
    obtaining a value of chlorophyll fluorescence using the acquired chlorophyll fluorescence image;
    estimating a phytochemical content of the selected plant based on the value of the chlorophyll fluorescence; and
    determining the maximum quantum yield based on the estimated phytochemical content of the selected plant.

4. The plant cultivation method according to claim 1, wherein the preset range has a lower limit of 0.68 and an upper limit of 0.69.

5. The plant cultivation method according to claim 1, wherein the phytochemical content of the selected plant includes phenolic content or antioxidant capacity.

6. The plant cultivation method according to claim 1, wherein the plant is a leafy vegetable or a medicinal plant.

7. The plant cultivation method according to claim 1, wherein a light source emitting the UVA includes a lighting-emitting diode (LED).

8. The plant cultivation method according to claim 1, wherein in the step of applying supplemental UVA lighting treatment to the selected plant further includes applying UVA capable of improving growth of the selected plant.

9. A plant cultivation system comprising:
    a plant cultivation chamber providing a space for cultivation of a selected plant;
    a light source illuminating the selected plant with light comprising visible light, white light, or both;
    a supplemental lighting unit illuminating the plant with UVA;
    a quantum yield measurement unit measuring a maximum quantum yield of the selected plant, wherein a phytochemical content is dependent upon the maximum quantum yield of the selected plant;
    a temperature controller controlling a temperature of the plant cultivation chamber;
    a humidity controller controlling a humidity of the plant cultivation chamber;

a culture medium supply unit supplying a culture medium to the selected plant; and a controller adapted to control operations of the plant cultivation chamber, the light source, the supplemental lighting unit, the quantum yield measurement unit, the temperature controller, the humidity controller and the culture medium supply unit;

wherein the controller is further adapted to determine a cultivation stage of the selected plant based on a measured maximum quantum yield of the selected plant by:

comparing the measured maximum quantum yield of the selected plant with a preset range,
wherein the preset range is a range of maximum quantum yield values that is predetermined to correspond to a phytochemical content range of the selected plant which is higher than an average value thereof for the selected plant, and
the preset range includes 0.6 to 0.72 for kale plants;
determining to harvest the selected plant if the measured maximum quantum yield falls within the preset range;
applying additional stress treatment to the selected plant if the measured maximum quantum yield is outside the preset range; or
forgoing to apply the additional stress treatment and sustaining growth of the selected plant until the maximum quantum yield of the selected plant reaches the preset range.

10. The plant cultivation system according to claim 9, wherein the light source is turned on and off alternately at intervals of 12 hours.

11. The plant cultivation system according to claim 9, wherein the supplemental lighting unit comprises a LED emitting UVA.

12. The plant cultivation system according to claim 9, wherein the quantum yield measurement unit further comprises a chlorophyll fluorescence image acquisition apparatus that acquires chlorophyll fluorescence image of the selected plant and the quantum yield measurement unit is configured to analyze the acquired fluorescence image of the selected plant and measure a maximum quantum yield of the selected plant.

13. The plant cultivation system according to claim 12, wherein the chlorophyll fluorescence image acquisition apparatus further comprises:
a chamber blocking external light;
a blue light source inducing fluorescence of the selected plant;
a filter filtering only chlorophyll fluorescence of the selected plant;
a camera photographing the filtered chlorophyll fluorescence; and
an image processor processing acquired image information.

14. The plant cultivation system according to claim 13, wherein the blue light source further include a light emitting diode.

15. A plant cultivation method using ultraviolet (UV) radiation, comprising:

applying supplemental ultraviolet A(UVA) lighting treatment to a selected plant;

determining a stress level of the selected plant to increase content of one or more phytochemicals of the selected plant by:

acquiring a chlorophyll fluorescence image of the selected plant and measuring a maximum quantum yield of the selected plant with a chlorophyll fluorescence meter;
obtaining a value of chlorophyll fluorescence using the acquired chlorophyll fluorescence image; and
determining stress characteristics of the selected plant by estimating the content of the phytochemicals in the selected plant based on the obtained chlorophyll fluorescence value and the maximum quantum yield of the selected plant,
wherein the content of one or more phytochemicals is dependent upon the maximum quantum yield of the selected plant;

determining a cultivation stage of the selected plant based on the stress characteristics of the selected plant, determining the cultivation stage comprising:

determining to harvest the selected plant if the measured maximum quantum yield falls within a preset range, wherein the preset range is a range of maximum quantum yield values that is predetermined to correspond to a phytochemical content range of the selected plant which is higher than an average value thereof for the selected plant, and the preset range includes 0.6 to 0.72 for kale plants;
applying additional stress treatment to the selected plant if the measured maximum quantum yield is outside the preset range; or
forgoing to apply the additional stress treatment and sustaining growth of the selected plant until the maximum quantum yield of the selected plant reaches the preset range.

16. The plant cultivation method of claim 15, wherein the step of applying additional stress treatment further comprises:

applying stress treatment using UV light, and using temperature, water, salt, ozone, or a combination thereof.

17. The plant cultivation method of claim 15, wherein the step of applying additional stress treatment further comprises altering wavelength, intensity, and duration of UVA.

18. The plant cultivation method of claim 15, wherein determining the stress characteristics of the selected plant further comprises analyzing correlations between an Fv/Fm value and the content of the phytochemicals, where the value of Fm refers to a value of fluorescence emitted from the selected plant when light energy used in photosynthesis is zero, and the value of Fv is a value obtained by subtracting a baseline fluorescence value from a maximum fluorescence value.

* * * * *

UNITED STATES PATENT AND TRADEMARK OFFICE
CERTIFICATE OF CORRECTION

| | | |
|---|---|---|
| PATENT NO. | : 11,547,062 B2 | Page 1 of 1 |
| APPLICATION NO. | : 17/073763 | |
| DATED | : January 10, 2023 | |
| INVENTOR(S) | : Myung Min Oh et al. | |

It is certified that error appears in the above-identified patent and that said Letters Patent is hereby corrected as shown below:

On the Title Page

Item (73), Assignee, "Industry-University Cooperation Foundation of Chungbuk National University, Chungcheongbuk-do (KR)" should be added.

Signed and Sealed this
Eleventh Day of June, 2024

Katherine Kelly Vidal
*Director of the United States Patent and Trademark Office*